(12) United States Patent
Dureau et al.

(10) Patent No.: US 7,890,978 B2
(45) Date of Patent: Feb. 15, 2011

(54) GENERIC DATA PROCESSING ENGINE

(75) Inventors: Vincent Dureau, Palo Alto, CA (US); Debra Hensgen, Redwood City, CA (US); Ludovic Pierre, San Francisco, CA (US); Jean-Rene Menand, Los Altos, CA (US)

(73) Assignee: Opentv, Inc., San Francisco, CA (US)

( * ) Notice: Subject to any disclaimer, the term of this patent is extended or adjusted under 35 U.S.C. 154(b) by 2078 days.

(21) Appl. No.: 09/827,358

(22) Filed: Apr. 5, 2001

(65) Prior Publication Data

US 2002/0015093 A1 Feb. 7, 2002

Related U.S. Application Data

(60) Provisional application No. 60/195,579, filed on Apr. 6, 2000.

(51) Int. Cl.
*H04N 5/445* (2006.01)

(52) U.S. Cl. .................. 725/48; 725/132; 725/140; 715/235; 348/553

(58) Field of Classification Search .............. 725/38, 725/39, 136, 48–54, 132, 140, 152; 348/461, 348/10, 387, 423, 553, 565, 563, 906; 715/235–239
See application file for complete search history.

(56) References Cited

U.S. PATENT DOCUMENTS 5,060,135 A * 10/1991 Levine et al. ............... 715/769
5,123,103 A * 6/1992 Ohtaki et al. .................... 1/1
5,394,347 A * 2/1995 Kita et al. ..................... 703/2

(Continued)

FOREIGN PATENT DOCUMENTS

EP 0 946 060 9/1999

(Continued)

OTHER PUBLICATIONS

Program Guide for Digital Television, ATSC Standar, Document A/55, Jan. 3, 1996.*

(Continued)

*Primary Examiner*—Annan Q Shang
(74) *Attorney, Agent, or Firm*—Rory D. Rankin; Meyertons, Hood, Kivlin, Kowert & Goetzel, P.C.

(57) ABSTRACT

A generic data processing engine is operable to receive a format definition and process data formatted according to the definition, without use of formatting information in the data. The format definition includes a description of the syntax of the format, and a description of the semantics of the format. The syntax and semantics may be described in the same language or in different languages, and the engine is configured to produce an internal representation of the syntax and semantics. The engine receives queries and uses them together with the internal representation to set masks for the filters. The filters apply the masks to the data and return filtered data to the engine, which may forward a portion of the filtered data to applications, store a portion of the filtered data, set new masks based on a portion of the filtered data, or modify the existing masks based on a portion of the filtered data. The filters may also be configured to return filtered data directly to applications, bypassing the engine.

58 Claims, 25 Drawing Sheets

U.S. PATENT DOCUMENTS

| | | | |
|---|---|---|---|
| 5,708,961 A | 1/1998 | Hylton et al. ............... 455/4.2 |
| 5,734,589 A | 3/1998 | Kostreski et al. |
| 5,752,159 A | 5/1998 | Faust et al. ................. 455/5.1 |
| 5,801,753 A | 9/1998 | Eyer et al. ..................... 348/13 |
| 5,844,615 A * | 12/1998 | Nuber et al. ........... 375/240.01 |
| 5,844,620 A | 12/1998 | Coleman et al. |
| 5,847,751 A | 12/1998 | Safadi |
| 5,852,565 A * | 12/1998 | Demos ....................... 708/203 |
| 5,960,437 A * | 9/1999 | Krawchuk et al. .......... 707/102 |
| 6,011,918 A | 1/2000 | Cohen et al. ................ 395/703 |
| 6,044,408 A | 3/2000 | Engstrom et al. ........... 709/302 |
| 6,147,712 A * | 11/2000 | Shimamoto et al. ......... 348/446 |
| 6,160,587 A * | 12/2000 | Walker et al. ............... 348/478 |
| 6,236,409 B1 * | 5/2001 | Hartman ..................... 345/629 |
| 6,286,133 B1 * | 9/2001 | Hopkins ..................... 717/143 |
| 6,289,501 B1 * | 9/2001 | Mutschler, III ............. 717/114 |
| 6,337,715 B1 * | 1/2002 | Inagaki et al. ............... 348/553 |
| 6,658,661 B1 * | 12/2003 | Arsenault et al. ............. 725/54 |
| 6,763,353 B2 * | 7/2004 | Li et al. ............................. 1/1 |
| 6,792,577 B1 * | 9/2004 | Kimoto ..................... 715/235 |
| 6,993,476 B1 * | 1/2006 | Dutta et al. ..................... 704/9 |
| 7,006,881 B1 * | 2/2006 | Hoffberg et al. ............. 700/83 |
| 7,441,263 B1 * | 10/2008 | Bakshi et al. ................. 726/2 |
| 7,590,644 B2 * | 9/2009 | Matsakis et al. ................... 1/1 |
| 2006/0265366 A1 * | 11/2006 | Winkelman et al. ........... 707/3 |

FOREIGN PATENT DOCUMENTS

WO     WO 00/27114     5/2000

OTHER PUBLICATIONS

Evain J-P: "The Multimedia Home Platform" EBU Review—Technical, European Broadcasting Union. Brussels, BE No. 275, Mar. 21, 1998 pp. 4-10, XP000767493 ISSN: 0251-0936.
Supplemental European Search Report in Application No. 01924699.0 Mailed Nov. 29, 2006.

* cited by examiner

```
Description ::= StructureDefinitions
StructureDefinitions ::= StructureDefinition MoreStructureDefinitions
MoreStructureDefinitions ::= StructureDefiniton | λ
StructureDefinition ::= StructureName "{" StructureBody "}"
StructureName ::= Variable
StructureBody ::= OptHeader FieldDefs
OptHeader ::= "type" "=" TypeName OptFilterValues";" | λ
TypeName ::= Variable
OptFilterValues ::= "," "filterValues" "=" FilterPairs | λ
FilterPairs ::= FilterPair OptMoreFilterPairs
OptMoreFilterPairs ::= FilterPair OptMoreFilterPairs | λ
FilterPair ::= "(" FilterField "," FilterValue ")"
FilterField ::= Variable
FilterValue:: PosInteger
FieldDefs ::= FieldDef OptMoreFieldDefs
OptMoreFieldDefs ::= FieldDef OptMoreFieldDefs | λ
FieldDef ::= SimpleFieldDef  | ComplexFieldDef
SimpleFieldDef ::= FieldName "," FieldSize "," SimpleFieldFormat OptValues ";"
FieldName ::= Variable | "reserved"
FieldSize ::= PosInteger
SimpleFieldFormat ::= PredefinedType
PredefinedType ::= Variable
OptValues ::= "," "=" Value OptValues | λ
Value ::= PosInteger
ComplexFieldDef ::= LoopDef | StructDef SEMICOLON | AlternateDef
LoopDef ::= "loop" "," LoopLength "," "{" FieldDefs "}"
LoopLength ::= Term OptMoreLoopLength
Term ::= PosInteger | StructVariable
OptMoreLoopLength ::= Operation Term OptMoreLoopLength | λ
Operation ::= "+" | "-"
StructVariable ::= Variable OptMoreVariables
OptMoreVariables ::= "." Variable OptMoreVariables | λ
StructDef ::= StructureName "(" ")"
AlternateDef ::= "alternate" "{" FieldDefs "}"
Variable ::= Letter RestrictedCharSet
RestrictedCharSet ::= Letter | Digit | "_" | λ
PosInteger ::= Digit MoreDigits
MoreDigits ::= Digit MoreDigits
Letter ::= "a" | "b" | ... | "z" | "A" | "B" | ... | "Z"
Digit ::= "0" | "1" | ... | "9"
```

FIG. 7

```
network_information_section {
      type = MPEG, filterValues = (PID, 8);
      table_id, 8, uimsbf, = 64, = 65;
      section_syntax_indicator, 1, bslbf;
      reserved, 1, bslbf;
      reserved, 2, bslbf;
      section_length, 12, uimsbf;
      network_id, 16, uimsbf;
      reserved, 2, bslbf;
      version_number, 5, uimsbf;
      current_next_indicator, 1, bslbf;
      section_number, 8, uimsbf;
      last_section_number, 8, uimsbf;
      reserved, 4, bslbf;
      network_descriptors_length, 12, uimsbf;
      loop, network_descriptor_length, {
            NITDescriptor();
      }
      reserved, 4, bslbf;
      transport_stream_loop_length, 12, uimsbf;
      loop, transport_stream_loop_length, {
            transport_stream_id, 16, uimsbf;
            original_network_id, 16, uimsbf;
            reserved, 4, bslbf;
            transport_descriptors_length, 12, uimsbf;
            loop, transport_descriptors_length, {
                  NITDescriptor();
            }
      }
}

NITDescriptor{
      alternate {
            network_name_descriptor();
            service_list_descriptor();
            ...
            data_broadcast_id_descriptor();
      }
}
```

FIG. 8

```
struct complexType {
        { this struct would be used to represent any structure or complex field}
        string Name;    {name of the structure or field; used to match value from semantic analyzer}
        complexTypeKind kind;   {enumerated type: one of structure, loop, or alternate} string baseProtocolType;   { for structures that have types }
                { above field is a handle allowing determination of the name of the lower level filter
                    and the mask representing the bits that the lower level filter is capable of
                    filtering on.}
        couplets *baseProtocolFieldValues;
                { this field shall contain a ptr to a list of memory locations that will contain the filter
                    pairs}
        alternativeList_t *alternatives;
                { pointer to a list of all of the possible alternatives for fields of this field or structure }

}tableType_t;

struct alternativeList {
        string Name;
        fieldDescription_t *fieldDescriptions
        { this would be a pointer to a linked list of lists of descriptions of the alternate lists of fields;
            since it is possible to know how many elements need to be in this list, space for it can be
            dynamically allocated and efficient access using pointer arithmetic is possible. }
        alternativeList_t *next;
}alternativeList_t;

struct fieldDescription {
        { this particular representation assumes that exactly enough space to hold all of the fields is
            allocated allowing direct access to any field without walking through a linked list, simply by
            using pointer arithmetic -- hence, there is no "next" field at the end.}
        string fieldName;   { this is also used to match value from semantic analyzer.}
        fieldTypeKind_t fieldTypeKind;   { enumerated type: one of basic, structure, or loop.}
        fieldType_t *fieldType;   { if basic, this is a pointer to one of the basic types listed in the
                    system encoding type tables;  in example above, these would be uimsbf and bslbf.
                    if structure or loop, this field is a pointer to a linked list of tableType_t structures, any of
                    which could occupy this field.}
        indexList_t *lengthList { see below for definition of structure pointed to by this field; allows the
                    length of the field to be a fixed constant, a value provided in another field (of any
                    structure or loop), or an arbitrary sum or difference of any of these. }
        indexList_t *offsetList {same format as lengthList, and computed/computable from the
                    lengthLists, but storing this valueallows direct access to this fieldDescription}
        value_list_t *valueList; { this is a list of values that have been specified for this field}
}fieldDescription_t;

struct indexList{
        enum valueKind;   { one of fixed_constant, reference_field or variable.
            fixed_constant means a fixed number of bits;  reference_field means that the length is given
            by another field in this (or another) structure, and variable means that it is not known.}
        valuePtr_t *valuePtr;{ this would be a pointer to an integer if type is fixed_constant, another
                    field if type is reference_field; or pointer is null if type is variable} int multiplier;   { either +1 or –1; allows arbitrary sums/differences for length }
        indexList *next;   { in case this value is a sum of other values}
}indexList_t;
```

FIG. 9

```
Define int Movie = 1;
Define string Actor = 'Actor';
Define string ProductionCompany = 'Production Company';

Define Object eventInfo = {
fetch(event_information_section,
filter:
table_id > 90,
table_id <= 113;
return:
name := loop_1 = outer_loop.loop1.extended_event_descriptor
= named_descriptor.loop_2.text_char[],
start_time := outer_loop.start_time,
end_time := compute(outer_loop.start_time + outer_loop.duration)
)

where channel(relop relationalOp, int value) =
{obtain triplet := identifyingTrio where channel(relationalOp, value);
set(event_information_section,
      filter:
      original_network_id == triplet.original_network_id,
      transport_stream_id == triplet.transport_stream_id,
      service_id == triplet.service_id);
}
/* See below for the definition of the identifyingTrio object */ eventType(relop relationalOp, int value) =
{set(event_information_section,
      filter: outer_loop.loop1.descriptor.content_descriptor.loop_1.
      content_nibble_1 relationalOp value); } instantiate(relop relationalOp1, string str1, relop relationalOp2,
      string str2) =
{set(event_information_section,
      filter:
      named_descriptor.loop_1=chosen_loop.item_description_char
      relationalOp str1,
      chosen_loop1.item_char relationalOp2 str2); } startTime(relop relationalOp, int t1) =
/* assumes that application program has already converted the
requested t1 into seconds past midnight local time.
Also, assumes that the following global variables are known,
all in seconds */

{set (event_information_section, filter: section_number >=
compute( ( (t1-Current_local_time) +
( ( Current_local_time - UTCDifference) mod 24) div 3) * 8),
outer_loop.start_time relationalOp t1);} endTime(relop relationalOp, int t2) =
{set(event_information_section,
filter:
section_number <= compute ( ( ( ( t2 - Current_local_time) +
      ( ( Current_local_time - UTCDifference) mod 24 ) )
```

FIG. 10a

```
        div 3) * 8) + 7),
        compute(outer_loop.start_time + outer_loop.duration)
        relationalOp t2);
} event_id(relop relationalOp, int value) =
{set(event_information_section,
        filter: outer_loop.event_id relationalOp value); }
}

Define Object identifyingTrio = {
fetch(channel_correspondence_section,
return:
original_network_id :=
        loop_1 = channel_loop.original_network_id,
transport_stream_id := channel_loop.transport_stream_id,
service_id := channel_loop.service_id)
where
channel(relop relopetionOp, int value) =
        {set(channel_correspondence_section,
        filter: channel_number relationalOp value);
}
}
```

FIG. 10b

```
Program ::= Definitions
Definitions ::= Definition OptMoreDefinitions
OptMoreDefinitions::= λ | Definition OptMoreDefinitions
Definition ::= DEFINE RestOfDef
RestOfDef ::= ConstantDef | ObjectDef
ConstantDef ::= Type VARIABLE EQUALS Value SEMICOLON
Type ::= INTTYPE | STRINGTYPE
Value ::= INTEGER | STRING
ObjectDef ::= OBJECT ObjName EQUALS LEFTCURLY Fetches OptRestObjDef RIGHTCURLY
ObjName ::= VARIABLE
Fetches ::= Fetch OptMoreFetches
OptMoreFetches ::= λ | Fetch OptMoreFetches
Fetch ::= FETCH LPAREN StructureName COMMA OptFilterPart ReturnPart RPAREN
StructureName ::= VARIABLE
OptFilterPart::= λ | FilterPart
ReturnPart ::= RETURN COLON ReturnStmts
ReturnStmts ::= ReturnStmt OptMoreReturnStmts
OptMoreReturnStmts ::= λ | COMMA ReturnStmt OptMoreReturnStmts
ReturnStmt ::= FieldName ASSIGNOP FieldValue
FieldName ::= VARIABLE
FieldValue ::= PathValue | ComputeExpression
PathValue ::= PathName OptArrayInd
OptArrayInd ::= λ | LSQUARE RSQUARE
PathName ::= NarrowName OptTempName OptRestOfPath
OptTempName ::= λ | EQUALS TempName
NarrowName ::= VARIABLE
TempName ::= VARIABLE
OptRestOfPath ::= λ | DOT PathName
ComputeExpression ::= COMPUTE LPAREN Expr RPAREN
Expr ::= Term RestOfExpr
RestOfExpr ::= λ | BinOperator Expr
Term::= CompoundTerm | SimpleTerm
CompoundTerm ::= LPAREN Expr RPAREN
SimpleTerm ::= INTEGER | PathName
BinOperator ::= PLUS | MINUS | TIMES | DIV | MOD | MIN | MAX
OptRestObjDef ::= λ | WHERE Methods
Methods ::=    Method OptMoreMethods
OptMoreMethods ::= λ | Method OptMoreMethods
Method ::= MethodName LPAREN ParamList RPAREN EQUALS MethodDefn
MethodName ::= VARIABLE
ParamList ::= λ | Parameter OptMoreParameters
OptMoreParameters ::= λ | COMMA Parameter OptMoreParameters
Parameter ::= SpecifiedArg | ConstantSpec | RelSpec
RelSpec ::= RELOP RelOpVariable
SpecifiedArg ::= VARIABLE
ConstantSpec ::= Type ConstantVar
ConstantVar ::= VARIABLE
RelOpVariable ::= VARIABLE
MethodDefn ::= LEFTCURLY OptAcquisitions FilterSets RIGHTCURLY
OptAcquisitions ::= λ | Acquisition OptAcquisitions
FilterSets ::= FilterSet OptMoreFilterSets
OptMoreFilterSets ::= λ | FilterSet OptMoreFilterSets
FilterSet ::= SET LPAREN StructureName COMMA FILTER COLON Filters RPAREN SEMICOLON
FilterPart ::= FILTER COLON Filters SEMICOLON
Filters ::= CompOperand OptArrayInd Comparator CompOperand OptMoreFilters
```

FIG. 11a

```
OptMoreFilters ::= λ | COMMA Filters
Comparator ::= RelOpVariable | DBLEQUALS | GT | GTEQ | LTEQ | LT | NOTEQUALS
CompOperand ::= PathName | ComputeExpression | INTEGER | STRING
Acquisition ::= OBTAIN ObjectInstantiation ASSIGNOP ObjName OptConstraint SEMICOLON
OptConstraint ::= WHERE OptConstraints
ObjectInstantiation ::= VARIABLE OptArrayInd
OptConstraints ::= λ | Constraint OptConstraints
Constraint ::= MethodName LPAREN ActualParamList RPAREN
ActualParamList ::= ActualParam OptMoreActualParams
OptMoreActualParams ::= λ | COMMA ActualParam OptMoreActualParams
ActualParam ::= VARIABLE | INTEGER
```

FIG. 11b

```
DefinionList_t *PtrToDefns;

struct DefinitionList {
      Defn_t *DefPtr;
      DefinitionList_t *NextDefn;
}DefinitionList_t;

struct Defn{
      enum DefnType; {One of "Integer", "String", or "Object"}
      string Name; {VARIABLE from ConstantDef or ObjName from
            ObjectDef}
      void *valuePtr; {points to an integer, a string or  ObjParts_t
            structure (defined below)}
} Defn_t;

struct ObjectParts{
      FetchList_t *FList;
      MethodList_t *MethodList;
}ObjParts_t;

struct MethodList{
      MethodStruct_t *MethodPtr;
      MethodList_t *NextMethod;
} MethodList_t;

struct FetchList{
      FetchStruct_t *FStruct;
      FetchList_t *NextFetch;
}FetchList_t;

struct FetchStruct{
      string StructureName;
      FilterList_t *FiltList;
      ReturnList_t *RtrnList;
}FetchStruct_t;

struct FilterList{
      FilterStruct_t *FiltStruct;
      FilterList_t *NextFilter;
}FilterList_t;

struct FilterStruct{
      string StructureName;
      FilterFieldList_t *FilterFields;
}FilterStruct_t;

struct FilterFieldList{
      FilterFieldStruct_t *FilterField;
      FilterFieldList_t *NextFilterField;
}FilterFieldList_t;

struct FilterFieldStruct{
      void *FirstOperand; { points to one of a pathList_t,
            ComputeStack_t, an integer, or a string }
      void *RelationalOp; { points to a string (if operator can
```

FIG. 12a

```
              vary) or an enum containing one of eq, gt, gteq, etc. )}
        enum RelationalType; { one of "string" or "actual"}
        void *SecondOperand; { same type as FirstOperand }
}FilterFieldStruct_t;

struct ReturnList{
        ReturnStruct_t *RtrnStruct;
        ReturnList_t *NextRtrn;
}ReturnList_t;

struct ReturnStruct{
        string NewFieldName;
        void *FieldValue; { ptr to one of a pathList_t or ComputeStack_t}
        enum type; { one of "path" or "computeStack" }
}ReturnStruct_t;

struct pathList{
        string Name;
        string tempName; {used in scope to mean that a single
              (sub-)structure is multiply constrained}
        pathList_t *nextName;
        enum Type; { one of "array" or "scalar"}
} pathList_t;

struct ComputeStack{
        void *ItemPtr; {points to item to push on list}
              {Item is of type integer, pathname, or operator}
              {operator is an enum type containing one of:
                     plus, minus, times, div, min, max, or mod}
        enum type; { one of "integer", "pathname" or "operator" }
        ComputeStack_t *nextToPushOn;
}ComputeStack_t;

struct MethodStruct{
        string MethodName;
        ParamList_t *ParamListPtr;
        MethodDefnStruct_t *MethodDefn;
}MethodStruct_t;

struct MethodDefnStruct{
        AcqList_t *AcqList;
        FilterList_t *FilterList;
}MethodDefnStruct_t;

struct AcqList{
        AcqStruct_t *AcqPtr;
        AcqList_t *NextAcq;
}AcqList_t;

struct AcqStruct{
        string NewObjName;
        enum ObjType; { one of "scalar" or "array"}
        string OldObjName;
        ConstraintList_t *Constraints;
} AcqStruct_t;

struct ConstraintList{
```

FIG. 12b

```
      ConstraintStruct_t *Constraint;
      ConstraintList_t *nextConstraint;
}ConstraintList_t;

struct ConstraintStruct{
      string MethodName;
      ActualParamList_t *ActualParams;
} ConstraintStruct_t;

struct ActualParamList{
      void *ActualParam; { points to a string or an int}
      enum type; {one of "string" or "integer" }
      ActualParamList_t *NextParam;
}ActualParamList_t;

struct ParamList{
      void_t *Param; {ptr to type SpecifiedArg_t, ConstantSpec_t, or
            RelSpec_t}
      enum type; { one of SpecifiedArg, ConstantSpec, or RelSpec}
      ParamList_t *NextParam;
}ParamList_t;

struct SpecifiedArg{
      string Argument;
}SpecifiedArg_t;

struct ConstantSpec{
      enum type; { one of "integer" or "string"}
      void *value; { pointer to an integer or a string}
} ConstantSpec_t;

struct RelSpec{
      string RelOpVariable;
}RelSpec_t;
```

FIG. 12c

Select all SoughtLoop = loop_1 from event_information_section where
    // event is of type "news"
    (content_nibble_1 from content_descriptor from SoughtLoop = = newstype)
        //where newstype is a pre-defined constant that has been assigned the value 2
    and
    // and it is in the same bouquet as the current actual_transport_stream
    (transport_stream_id = =
        (Select transport_stream_id from MidLoop = loop_2 from
        CurrentBouquet = bouquet_association_section where
            ((Select transport_stream_id
                from OtherMidLoop = loop_2 //ok =MidLoop
                from CurrentBouquet = =
                      (Select transport_stream_id from
                      Actual_NIT = network_information_section
                      where table_id = = 64)) and (Select original_network_id
                from OtherMidLoop
                from CurrentBouquet = =
                (Select network_id from Actual_NIT)))

and
    (original_network_id = =
        (Select original_network_id from MidLoop from CurrentBouquet))
    // and it is carried on cable (as opposed to satellite or terrestrial)
    and
    transport_stream_id = =
        (Select transport_stream_id from DeliveryLoop = loop_2 from
            AnyNIT = network_information_section where
            exists cable_delivery_system_descriptor from DeliveryLoop from AnyNIT)
    and
    original_network_id ==
        (Select original_network_id from DeliveryLoop from AnyNIT)
    // and its time is within the requested range
    and
    DVB_time_Between(RequestedStartTime, RequestedEndTime, SoughtLoop.start_time,
        SoughtLoop.duration)

FIG. 13

```
//
// expansion of DVB_time_Between from previous figure
// (almost complete – see last comment below for a few details
// intentionally left out)
start_time >= RequestedStartTime
and
start_time + duration <= RequestedEndTime
and
time_since_midnight = CurrentLocalTime – (TimeDiff) (mod 24)
// CurrentLocalTime and the offset from UTC-0 is generally cached within a
// set-top box – if they are not they can be obtained from the TOT or TDT tables.
and
StartInUTC0 = max(0, (RequestedStartTime – CurrentLocalTime)-
time_since_midnight))
and
EndInUTC0 = max(96, (RequestedEndTime – CurrentLocalTime) –
time_since_midnight)
and
(StartInUTC0 div 3) * 8 <= section_number <= ((EndInUTC0 div 3) * 8) + 7
and
this_section_number = section_number <= last_section_in_segment_number from
event_information_section where
        first_section_in_segment = section_number from
event_information_section where
                first_section_in_segment <= this_section_number and
                first_section_in_segment div 8 = = 0
// Should be code in the beginning converting all of the parameters and
// known constants (including RequestedStartTime, RequestedEndTime,
// CurrentLocalTime, and TimeDiff) as well as the time values extracted from
// each event_information_section loop (including start_time and duration) to
// the number of minutes since midnight GMT, January 1, 1970 – or some
// other reference date. It is the converted values that are expected to be
// used for the comparisons above.
```

FIG. 15

```
ActualTransportStreamID(X) :-
        program_association_table(A), is_field(A, transport_stream_id, X).
// X is the actual transport stream id if the program association section (A) has, as a
// transport_stream_id field with a value of X.

TransportStreamInBouquet(C, B) :-
        bouquet_association_section(L),
        is_field (L, bouquet_id, B),
        is_field(L, transport_stream_id, C).
// C is in Bouquet with bouquet_id B if a bouquet_association_section L has a bouquet_id
// field with a value of B and a transport_stream_id field with a value of C.

TransmissionMedia(X, media) :-
        ActualTransportStreamID(X),
        // case 1: X is the actual transport stream
        network_information_section(N),
        is_field(N, table_id, 32),
        is_field(N, loop1, L),
        is_field(L, descriptor, D),
        frequency_list_descriptor(D)
        is_field(D, coding_type, media).

// The transmission media of transport stream X is "media" if X is the actual transport
// stream ID, N is a network_information_section for the current stream, L is loop 1 of N,
// // D is a frequency_list_descriptor in L, and D has coding_type field of that "media. "

TransmissionMedia(X, media) :-
        network_information_table(N),
        is_field(N, loop2, L),
        is_field(L, transport_stream_id, X),
        is_field(L, descriptor, D),
        frequency_list_descriptor(D)
        is_field(D, coding_type, media).

// Another possibility for X having a transmission media "media"
// Here N can be any network_information_table where the second loop contains the
// transport_stream_id in question and it has a coding_type field of value that "media."
```

FIG. 16

```
GetAllEITEvents(X, [LocalStartTime,LocalEndTime], DefiniteEvents) :-
        // This rule tells how to obtain all EITs that contain schedules for the transport
        // stream whose id is X for events that occur within the local time range.
    SchedulesAreBroadcast(X),
        // step 1: determine whether any of the services carried on the transport stream
        // whose id is X has its schedule broadcast.  If it does not, there
        // will be no such EITs, report this.
    ObtainLocalTime(CurrentTime),
    LocalEndTime > CurrentTime,
    ComputeOffsetRange([LocalStartTime, LocalEndTime], CurrentTime, OffsetRange),
        // step 2: determine the local time and how far ahead of this (at least part of) the
        // range is.  If the entire range is past, report an error. Otherwise, we have a new
        // range, which we'll call an offset range (OffsetStart, OffsetEnd).
    GetUTC_0Time(CurrentUTC_0),
        // step 3: Determine the current time in UTC-0, assuming that it is transmitted
        // as a 24 hour clock, so it is the # of hours since midnight "today."
    TimeSince12Range(CurrentUTC_0, OffsetRange, RangeSince12),
        // step 4: Add the hours since midnight obtained in step 3 to both the OffsetStart
        // and OffsetEnd to determine the block of time since midnight UTC-0 for which
        // schedules are desired.
    TranslateTimeToEITSegmentNumber(RangeSince12, SegmentStart, SegmentEnd),
        // step5: Determine the segment range and request the EIT scheduled in those
        // segment ranges.
    GetEITEventsInRange(SegmentStart, SegmentEnd, X, PossibleEvents),
    CheckTimes(LocalStartTime, LocalEndTime, PossibleEvents, DefiniteEvents).
```

FIG. 17a

```
SchedulesAreBroadcast(X) :-
        service_description_table(S), is_field(S, transport_stream_id, X),
        is_field(S, loop1, L), is_field(L, EIT_schedule_flag, Flag),
        Flag == 1.
```

FIG. 17b

```
GetEITEventsInRange(SegmentStart, SegmentEnd, X, Events) :-
        SegmentEnd > SegmentStart,
        event_information_section(S), is_field(S, transport_stream_id, X),
        is_field(S, section_number, SegmentStart),
        is_field(S, segment_last_section_number, SLN),
        is_field(S, loop_1, L), Append( L, Events),
        GetRestOfEITSegment(SegmentStart+1, SLN, X, Events),
        NewStart = SegmentStart + 8,
        GetEITsInRange(NewStart, SegmentEnd, X, Events).

GetRestOfEITSegment(SegmentStart, SegmentEnd, X, Events) :-
        SegmentEnd >= SegmentStart,
        event_information_section(S), is_field(S, transport_stream_id, X),
        is_field(S, section_number, SegmentStart),
        is_field(S, segment_last_section_number, SLN),
        is_field(S, loop_1, L), Append( L, Events),
        GetRestOfEITSegment(SegmentStart+1, SLN, X, Events).
```

FIG. 17c

ObtainLocalTime(CurrentTime) :-
    time_offset_section(S), is_field(S, UTC_time, CurrentMJD_UTC_0),
    is_field(S, loop1, L), is_field(L, descriptor, D),
    local_time_offset_descriptor(D), is_field(D, local_time_offset_polarity, P),
    is_field(D, local_time_offset, Offset),
    ConvertToHoursSince_1_1_1900(CurrentMJD_UTC_0, CurrentTime, P, Offset).
    // ConvertToHoursSince1900 not shown – can be implemented using arithmetic
    // formulas copied, nearly identically from DVB EN300_468, Annex C – note
    // that (-1) is raised to the P power and multiplied by the offset.

GetUTC_0Time(CurrentUTC_0) :-
    time_date_section(S), is_field(S, UTC_time, CurrentMJD_UTC_0),
    ConvertToHoursSince_1_1_1900(CurrentMJD_UTC_0, CurrentUTC_0, 0, 0).

ComputeOffsetRange([LocalStartTime, LocalEndTime], CurrentTime, [OffsetStart, OffsetEnd]) :-
    LocalStartTime > CurrentTime, OffsetStart = LocalStartTime – CurrentTime, OffsetEnd =
    LocalEndTime – CurrentTime.
    // if entire range is after the current time – otherwise, see next rule ComputeOffsetRange([LocalStartTime, LocalEndTime], CurrentTime, [OffsetStart, OffsetEnd]) :-
    OffsetStart = 0, OffsetEnd = LocalEndTime – CurrentTime.

TimeSince12Range(CurrentUTC_0, [OffsetStart, OffsetEnd], [StartTimeSince12, EndTimeSince12]):-
    StartTimeSince12 = CurrentUTC_0 + OffsetStart,
    EndTimeSince12 = CurrentUTC_0 + OffsetEnd.

FIG. 17d

```
TranslateTimeToEITSegmentNumber([StartTimeSince12, EndTimeSince12],
SegmentStart, SegmentEnd):-
      SegmentEnd = ( (EndTimeSince12 div 3) * 8 ) +7,
      SegmentEnd < 256,
      SegmentStart = (StartTimeSince12 div 3) * 8).
// use above if all times in range – otherwise use below.

TranslateTimeToEITSegmentNumber([StartTimeSince12, EndTimeSince12],
SegmentStart, SegmentEnd):-
      SegmentEnd = ( (EndTimeSince12 div 3) * 8 ) +7,
      SegmentEnd > 255, SegmentEnd = 255,
      SegmentStart = (StartTimeSince12 div 3) * 8).
```

FIG. 17e

```
CheckTimes(LocalStartTime, LocalEndTime, [FirstEvent | MoreEvents], DefiniteEvents)
:-
      // an event corresponds to the contents of the first loop from an EIT.
      is_field(FirstEvent, start_time, Start), Start >= LocalStartTime,
      is_field(FirstEvent, duration, duration), LocalEndTime >= LocalStartTime +
duration,
      Append(FirstEvent, DefiniteEvents),
      CheckTimes(LocalStartTime, LocalEndTime, [MoreEvents], DefiniteEvents).
CheckTimes(LocalStartTime, LocalEndTime, [FirstEvent | MoreEvents], DefiniteEvents)
:-
      // an event corresponds to the contents of the first loop from an EIT.
      is_field(FirstEvent, start_time, Start), Start < LocalStartTime,
      CheckTimes(LocalStartTime, LocalEndTime, [MoreEvents], DefiniteEvents).
CheckTimes(LocalStartTime, LocalEndTime, [FirstEvent | MoreEvents], DefiniteEvents)
:-
      // an event corresponds to the contents of the first loop from an EIT.
      is_field(FirstEvent, start_time, Start), Start >= LocalStartTime,
      is_field(FirstEvent, duration, duration), LocalEndTime < LocalStartTime +
duration,
      CheckTimes(LocalStartTime, LocalEndTime, [MoreEvents], DefiniteEvents).
```

FIG. 17f

?- event(X), eventTitle(X, Y), eventType (X, "news"), eventsTS(X, A),
TransportStreamInBouquet(A, B), ActualTransportStreamID(Z),
TransportStreamInBouquet(Z, B),
GetAllEITEvents(A, [[June, 13, 2000, 0930],[June,13,2000,1300], DefiniteEvents],
is_member(X, DefiniteEvents), networkType(A, "cable").

FIG. 18

GENERIC DATA PROCESSING ENGINE

CROSS REFERENCE TO RELATED APPLICATIONS

This application claims priority to U.S. Provisional Patent Application No. 60/195,579 entitled "GENERIC SI ENGINE CREATION PROCESS" filed Apr. 6, 2000 (ATTORNEY DOCKET NO. OPTVP006+), which is incorporated herein by reference for all purposes.

FIELD OF THE INVENTION

The present invention relates generally to a generic engine for processing data, and more particularly, to a system and method for a generic engine for processing application requests for formatted data, such as television-related information in an interactive television system.

BACKGROUND

A broadcast service provider transmits audio-video streams to a viewer's television. Interactive television systems are capable of displaying text and graphic images in addition to typical audio-video programs. They can also provide a number of services, such as commerce via the television, and other interactive applications to viewers. The interactive television signal can include an interactive portion consisting of application code, data, and signaling information, in addition to audio-video portions. The abbreviation "SI" in this application is used to refer to both signaling information and any of the application data that is sent according to a rigid format. The SI may include information such as times or channels upon which a particular television program will be shown, the genre of a particular program, or information identifying which elementary stream will carry the audio for a particular program in a particular language. This information can be combined into a single signal or several signals for transmission to a receiver connected to the viewer's television or the provider can include only a subset of the information, possibly with resource locators. Such resource locators can be used to indicate alternative sources of interactive and/or audio-video information. For example, the resource locator could take the form of a world wide web universal resource locator (URL).

The television signal is generally compressed prior to transmission and transmitted through typical broadcast media such as cable television (CATV) lines or direct satellite transmission systems. Information referenced by resource locators may be obtained over different media, for example, through an always-on return channel, such as a DOCSIS modem.

An integrated receiver decoder (IRD) controls the interactive functionality of the television. The IRD receives the signal, separates the interactive portion from the audio-video portion, and decompresses the respective portions of the signal. The IRD uses some of the interactive information to execute an application while some of the audio-video information is transmitted to the television.

An SI engine executes within an IRD, filtering the broadcast streams, extracting information requested by applications, and delivering information to applications. Such SI engines are typically constructed for use with a particular SI specification that is designed for a particular cable, satellite, RF or other system. That is, the code for the SI engine is tailored directly to the SI format used by that system. In response to an application's request for data, the SI engine sets masks for filters, modifies masks, receives information from the filters, and returns the information to the applications. The encoding of SI in the data stream is dependent on the format used in a particular system, and typically varies from one system to another, as well as slowly over time in the same system.

Thus, if a different system is to use a different SI specification, a new engine, possibly derived from an existing engine, must be constructed. SI specifications are often modified after a system is fielded, with the purpose of, for example, providing additional functionality. In these cases, the SI engine in such systems must be dynamically upgraded. As the SI engine is typically incorporated in either the operating system or the middleware that executes in the IRD, installation and/or modification is logistically complex, often expensive and certainly time-consuming.

It is also possible to always transmit formatting information (such as HTML tags) along with formatted data. However, this solution is not viable where bandwidth is limited, as is the case with television-related metadata, because in such cases, transmitting the format data itself every time the formatted data is sent would require an order of magnitude more bandwidth.

There is a need, therefore, for an improved SI engine capable of processing any SI format, that can be upgraded easily and without requiring continuous use of precious bandwidth on the broadcasting system.

SUMMARY OF THE INVENTION

A generic data processing engine is operable to receive a format definition and process data formatted according to the definition, without use of formatting information in the data.

In one embodiment, the format definition includes a description of the syntax of the format, and a description of the semantics of the format. The syntax and semantics may be described in the same language or in different languages, and the engine is configured to produce an internal representation of the syntax and semantics.

The engine may be configured to receive queries and use them together with the internal representation to set masks for the filters. The filters apply the masks to the data and return filtered data to the engine, which may forward a portion of the filtered data to applications, store a portion of the filtered data, set new masks based on a portion of the filtered data, or modify the existing masks based on a portion of the filtered data. The filters may also be configured to return filtered data directly to applications, bypassing the engine.

Methods and computer program products in accordance with the foregoing are also disclosed.

Other features, advantages, and embodiments of the invention will be apparent to those skilled in the art from the following description, drawings, and claims.

BRIEF DESCRIPTION OF THE DRAWINGS

FIG. 7 illustrates an embodiment of an SI syntax specification language;

FIG. 8 illustrates an embodiment of a specification of the syntax for part of an SI format;

FIG. 9 illustrates an embodiment of a data structure that may be used to store an internal representation of a SI syntax format description;

FIGS. 10*a* and 10*b* illustrate an embodiment of part of a particular system's specification for the semantics of its SI;

FIGS. 11*a* and 11*b* illustrate an embodiment of a grammar that defines the syntax for the non-terminals of part of a particular SI semantics language;

FIGS. 12*a*, 12*b*, and 12*c* illustrate an embodiment of a data structure that may be used to store an internal representation of a SI semantics format description;

FIG. 13 illustrates an embodiment of an application query for SI information using a low-level query language;

FIG. 15 illustrates an embodiment in which complex semantics of a constraint are specified in an application request;

FIG. 16 illustrates an embodiment in which Prolog is used to define the semantics of part of a system's SI;

FIGS. 17*a*-17*f* illustrate specifications in one embodiment of semantics for a complex SI format;

FIG. 18 illustrates an embodiment of an application request expressed using the SI format whose semantics are defined in FIGS. 17*a*-17*f*.

Corresponding reference characters indicate corresponding parts throughout the several views of the drawings.

DETAILED DESCRIPTION OF THE INVENTION

Figure 1:
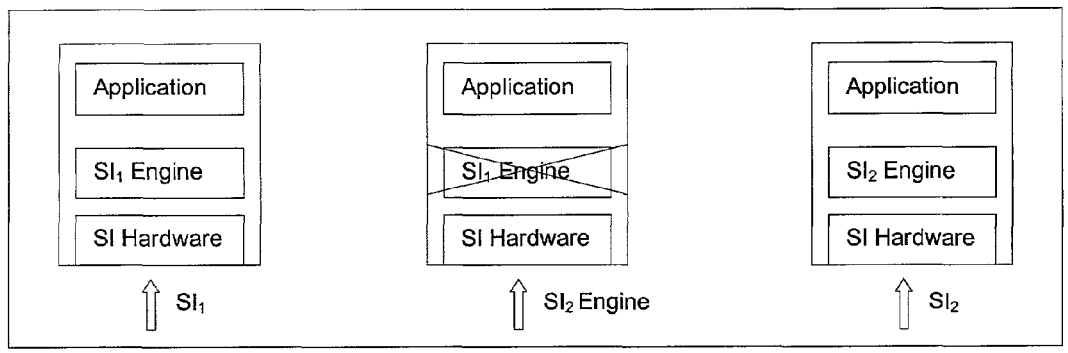
FIG. 1 is a diagram illustrating the current practice of replacement of SI engine software when a different version is needed to process a different SI specification.

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. It will be understood by one skilled in the art that many embodiments are possible, such as the use of a computer system and display to perform the functions and features described herein. For purpose of clarity, the invention will be described in its application to a set top box used with a television, and details relating to technical material that are known in the technical fields related to the invention have not been included.

Overview

As will be described herein, the present invention relates to an engine for processing rigidly formatted data. By way of non-limiting illustration, the invention will be described in its application to processing broadcast television-related metadata (such as SI) in an integrated receiver-decoder (IRD), which may, for example, be implemented within a television, incorporated with a personal video recorder (PVR), or be in a separate set-top box. The term "metadata" as used herein should be understood to refer to any kind of formatted data, and the principles of the invention may apply to other applications involving the use of formatted data that do not necessarily relate to television, such as weather forecast data. Also, data may be transmitted by means other than broadcasting, such as multicasting and point-to-point connections. Disclosed herein are a method and system for a generic SI engine that processes application requests for television-related, formatted metadata.

SI engines are used to support digital interactive television applications. Both the SI engine and the digital interactive applications execute in an integrated receiver decoder (IRD). As stated above, the IRD may be implemented in a set top box, in a television, or other device. Digital interactive television applications often require access to up-to-date information that is being sent by a broadcaster or system operator, such as times or channels upon which a particular television program will be shown, the genre of a particular program, or information identifying which elementary stream will carry the audio in a particular language. SI may also include any data whose purpose is to describe other data or television content.

Typically, SI is sent, embedded in the transmission stream, according to a rigid format. SI is not self-describing; i.e., there is no information embedded in the SI that describes its format, such as tags. In markets where the broadcaster or network operator furnishes the IRD, each broadcaster or network operator ultimately decides the particular format used for SI for its network, whereas in markets where the consumer may have purchased any of a number of commercially available IRDs, multiple SI formats may be used concurrently. Usually, a format is based upon one of the several SI format specifications that have been developed by standards organizations, such as DVB (Digital Video Broadcasting) or ATSC (Advanced Televisions Systems Committee). These specifications have been written so that they can easily be extended to suit additional needs of others, such as individual broadcasters or subcommittees of the same standard organization that are addressing different problems. This flexibility is usually provided by reserving some sequence of bits in various positions for later definition, i.e., if a committee has seen a need for only 3 different values, it may allow 3 or 4 bits to permit up to 5 or 13 additional uses, respectively, for a given field. However, once a value is chosen to mean a particular use, the format is rigid until new uses are added. When new uses are added, the format must be changed to reflect the assignment of values to the new uses.

Often, the integrated receiver decoders have filters that can be used to quickly search through data streams for the presence of particular data patterns. SI engines typically set masks for these filters. A mask is used to describe a particular data pattern. For example, the binary mask 111xx000 identifies the pattern of three 1s, followed by any two bits, followed by three 0s. In addition to designating a pattern, a mask may designate position; for example, stipulating that such a binary pattern must occur at the beginning of a fixed sized packet.

SI is sent in a rigid format so the filters, often implemented in hardware, can efficiently separate out the information desired by the application or viewer using the IRD. Other IRDs being used by other viewers may filter for other information, depending on the viewers' preferences and/or applications being executed. Typically, the viewer interacts with the IRD by pressing buttons on the remote control or keyboard, which in turn causes information to be delivered to application-level software executing on a processor in the IRD. In order to service a viewer's request, the application software may need to access some of the data from the SI portion of a stream that is being received. The application software would then request this data from the SI engine that executes on the IRD.

Like the application-level software, the SI engine may be software, albeit typically at the OS or middleware level rather than at the application level, that executes on the IRD, although it may also be implemented in hardware. Its function is to assist application-level software in efficiently obtaining SI information from the transmitted stream. When an SI engine receives a request from an application program, it will use the underlying filters (which may be implemented in hardware) to obtain the information requested by the application.

For example, the application may request the names of all movies that will be broadcast between 9 p.m. of the current day through 1 a.m. of the next day on a set of 16 different channels, numbered 16 through 31. In a certain SI format, this may translate to a set of possible bit patterns in the first 13 bytes of an MPEG-2 packet along with certain structure further back in the packet. A particular IRD may contain special purpose hardware that is capable of filtering on the first 8 bytes of a packet. The SI engine could then create a set of masks to provide to the filters so that the filters would discard any packets not matching one of the viable 8-byte patterns of the elements of the desired set. This reduces the number of entire packets that the SI engine itself would need to process. This requires the SI engine to understand both the rigid structure in which SI is sent by a given network, as well as the meaning behind particular bit patterns appearing in that structure.

SI is typically transmitted by television broadcasters along with video, audio, and other private data. The data structures in which the SI is contained are in a state of flux, due to upgrades and changes by international standards bodies and broadcasters, and in some cases, entirely new structures are defined, resulting in changes to the SI specification. The SI engine must be capable of handling data in the changed SI specification. As will be disclosed herein, the present invention provides for a flexible SI engine capable of handling any SI specification transmitted to it in accordance with the invention, enabling it to be easily upgraded to a revised SI specification.

Although application of the SI engine in a television broadcast system may not require it to be capable of processing more than one SI format at a time, a generic SI engine that can be configured to process any SI format has several advantages. Such software can be more thoroughly tested than its non-generic counterpart, and most importantly, it is substantially easier to upgrade to new versions of the SI format. In addition, the time from definition of a new SI format to the use of that format can be substantially shortened. With typical SI engines, any change to the SI definition necessitates a change to the system software that executes in the integrated receiver decoder (IRD). Broadcasters thus cannot use a new SI definition until: (i) new software has been designed, written, and tested; and (ii) all integrated receiver decoders have been upgraded, including those currently in use by customers.

FIG. 1 illustrates a situation that does not use the generic SI engine for a vertical market (a market in which the IRD is furnished by the system operator or broadcaster). Here at least the software for the SI engine must be reinstalled. The difficulty of upgrading the software in a broadcast environment is compounded by the nature of the system. The software to be reinstalled must be continually broadcast if there is no mechanism available to allow downloading via a return channel. Even if there is a return channel, a signal to indicate availability of the new version must be broadcast repeatedly because not all IRDs will necessarily be turned on at the same time. In addition, use of the new format would likely be delayed until a substantial percentage of the IRDs had been upgraded.

Figure 2:
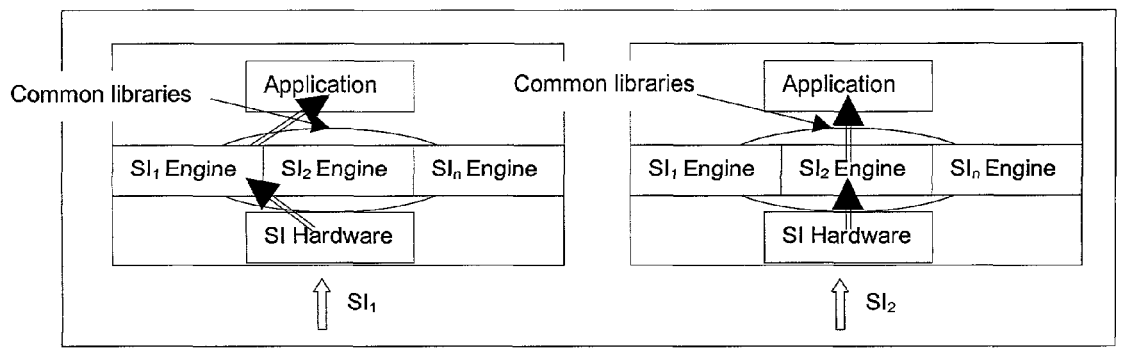
FIG. 2 is a diagram illustrating a process envisioned for SI engine changes for new "horizontal free-to-air markets"

In an approach known as the "horizontal market," integrated receiver decoder manufacturers will manufacture and sell operator-independent decoders. These decoders will be useful to any consumer, regardless of the operator being used by the consumer. However, this approach is complicated by the broadcasters' desire to broadcast their own signaling that may not be completely standard, and thus the manufacturer would have to produce a different SI engine for each SI specification with which it desires to be compatible. As illustrated in FIG. 2, when several different broadcasters have modified standards for their own systems, the SI engine must be able to accommodate multiple different SI formats simultaneously. Additionally, if a new SI specification is later introduced or an existing specification is updated, the decoder will not have an SI engine to process the new SI specification, and must be updated with new SI engine software in the manner illustrated by FIG. 1. In other words, this scenario would require all SI formats to be defined prior to construction of the SI engine, otherwise the SI engine would have to be updated, as described earlier.

Figure 3:
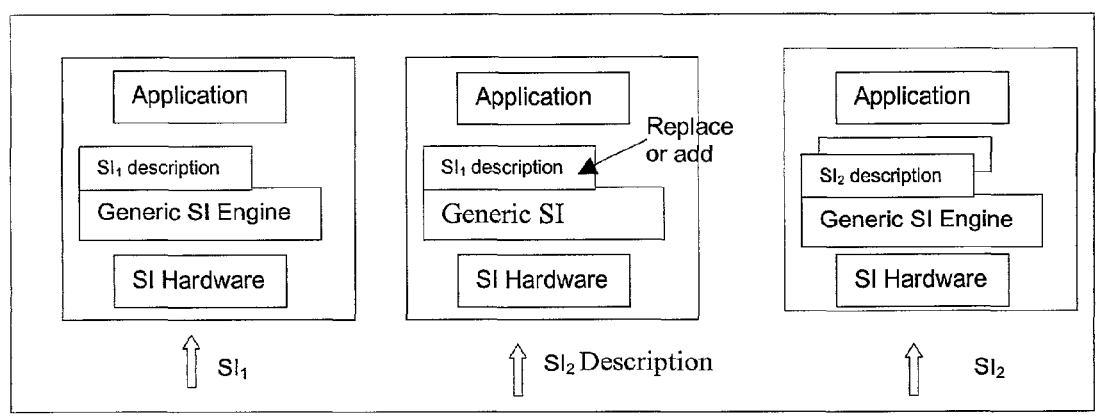
FIG. 3 is a diagram illustrating the generic SI engine and its reconfiguration to use a new SI specification.

A generic SI engine in accordance with the invention enables a broadcaster or system operator to configure the SI engine so that it can handle the broadcaster's signaling, by broadcasting a description of the SI in a language understood by the generic SI engine. Upon receiving the description, the generic SI engine reconfigures itself to handle the new signaling, as shown in FIG. 3. By using the inventive reconfigurable SI engine, the integrated receiver decoder is no longer required to contain specific software to handle each operator's signaling format. No source code needs to be written or modified in order to utilize a new SI format, and the software for the SI engine does not require modification or replacement. Only a description of the new SI format's syntax (structure) and semantics (meaning) must be furnished to the SI engine. This information is typically much smaller than a new SI engine itself and is much easier to install than new software. Finally, the probability of introducing incompatibilities with existing installed software is eliminated, because the software itself does not need to be changed.

In an embodiment of the invention, the SI engine comprises an application interface, a filtering interface, and a format specification interface. The application interface is responsible for receiving requests from applications, and may also be used to return information to those applications. The filtering interface is used to construct or modify masks for filters, which may be implemented in either hardware or software. As data is received from a broadcast stream (or via other means such as a point-to-point connection) and processed by the filters, the data extracted by the filters may be provided to the generic SI engine or directly to the applications. Prior to providing information obtained via the filters to the applications, the generic SI engine may process that data, and, in so doing, may set additional masks or modify existing masks. The format specification interface is capable of receiving and processing descriptions of new formats, which may later be used by applications when they make requests via the application interface. The formatted data and the format specifications may be embedded in a television broadcast stream or be transmitted separately by other means such as multicasting or a point-to-point connection. The syntax and semantics of new formats may be transmitted separately from one another or together.

If a new format specification is being used, it may be transmitted to the generic SI engine, which will be reconfigured to use the new format specification. The operation of the generic SI engine will be described herein by reference to its use, in an embodiment of the invention, as a component of distributed, interactive television systems.

Detailed Description

Figure 4:
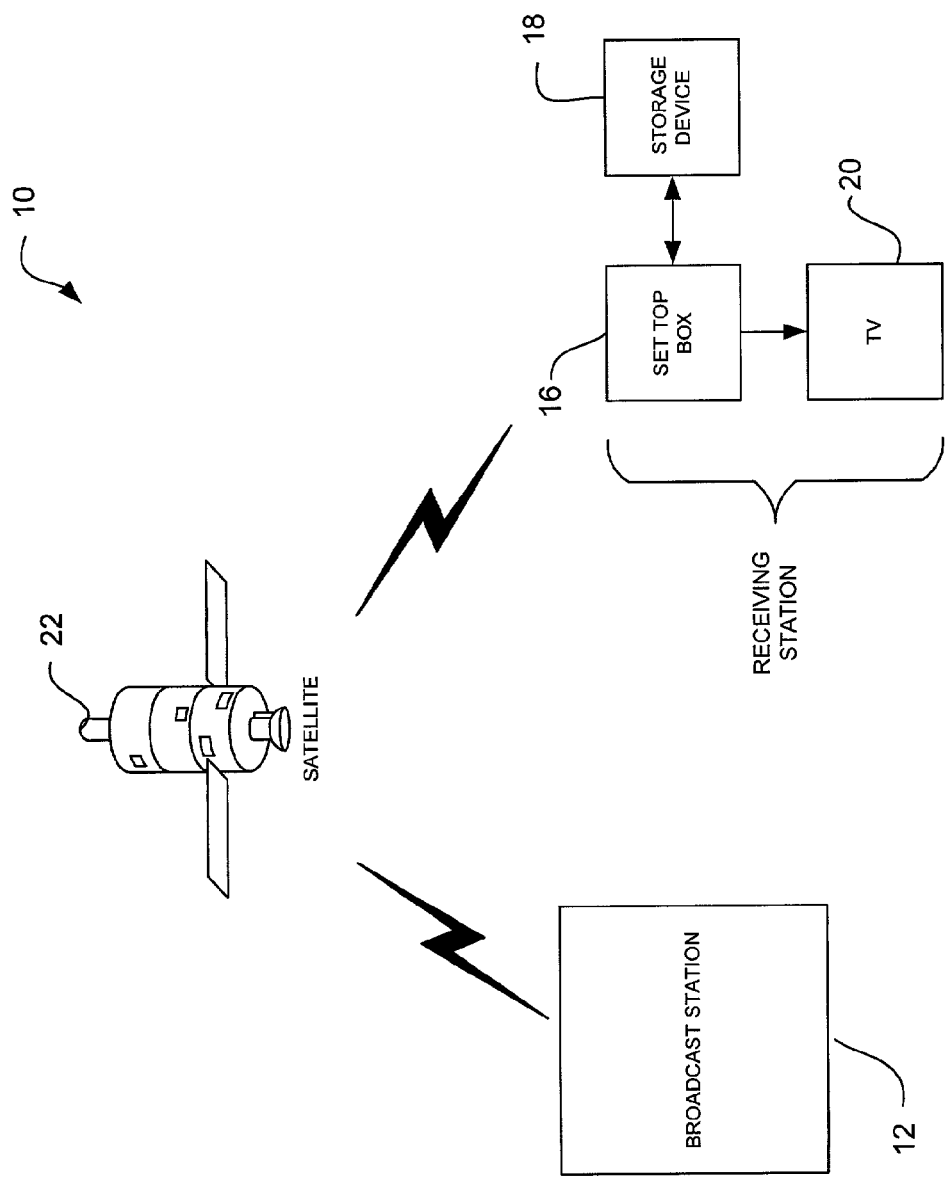
FIG. 4 is a diagram illustrating the distribution of television programs and signaling information from a broadcast station to a receiving station.

Referring to FIG. 4, a diagram of a television broadcast and receiving system is shown and generally indicated at 10. The system 10 includes a broadcast station 12 where audio-video and control information are assembled in the form of digital data and mapped into digital signals (which may also be analog) for satellite transmission to a receiving station. The broadcaster may include television-related, rigidly formatted metadata called SI. The SI is embedded in the broadcast stream. The SI may, for example, list each of the elementary stream identifiers and associate with each identifier an encoding that describes the type of the associated stream (e.g., whether it contains video or audio, which perspective it represents, or what language is being carried in the stream), television program information such as time, date, and channel. The SI is converted by the broadcast station to a format suitable for transmission over broadcast medium. The data may be formatted into packets, for example, which can be transmitted over a digital satellite network 22, cable television wires, telephone lines, cellular networks, fiber optics, or any other appropriate media. The packets may be multiplexed with other packets for transmission.

Figure 5:
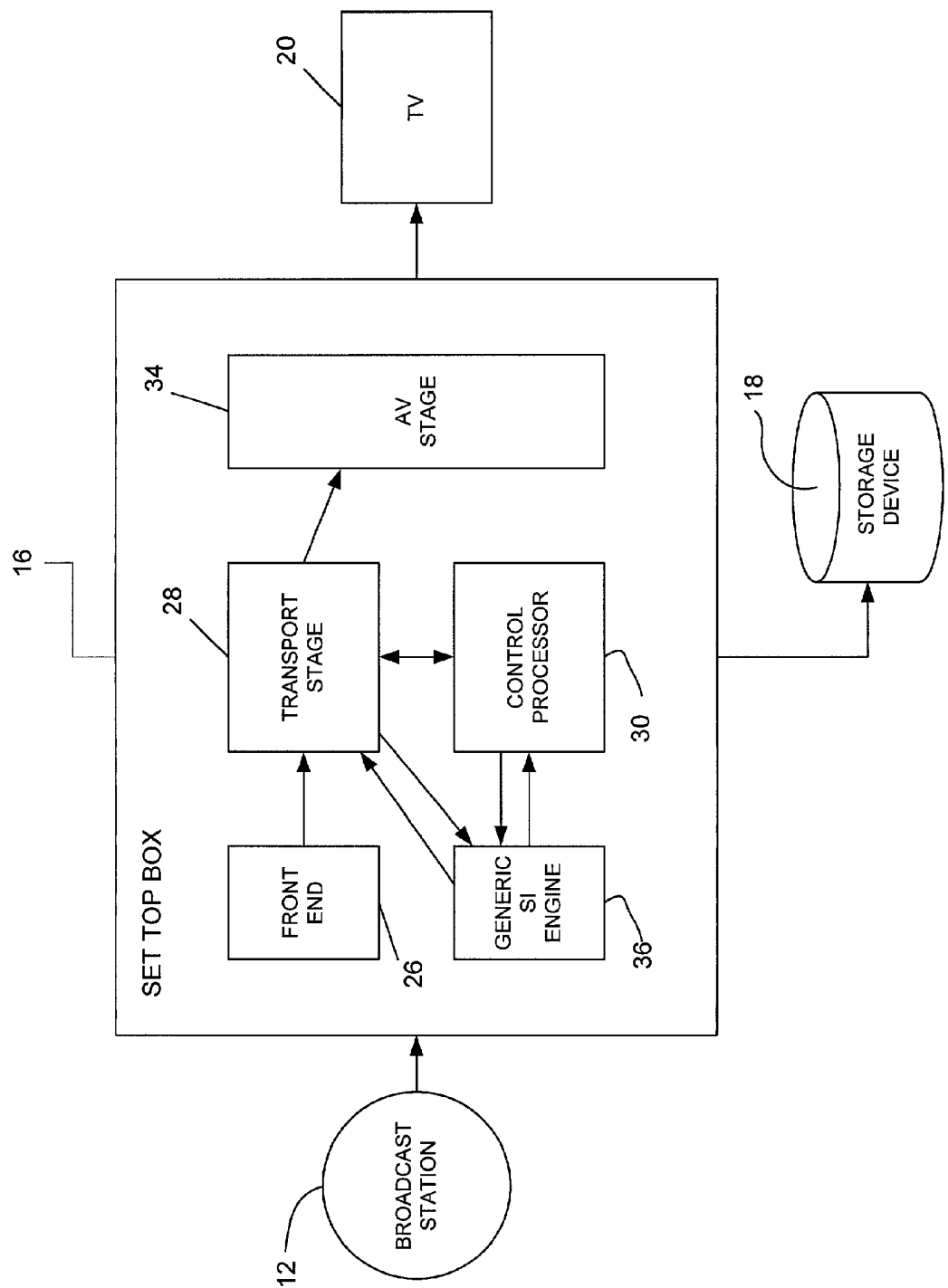
FIG. 5 is a diagram illustrating a set top box incorporating a generic SI engine in one embodiment of the invention.

The receiving station includes an integrated receiver decoder in the form of a set top box 16, connected to a storage device 18 and a television 20 that is used to present programs to a viewer, as shown in FIG. 5. The set top box 16 is operable to decompress the digital data. The decompressed video signals may be converted into analog signals such as NTSC (National Television Standards Committee) format signals for television display, or may be in digital format for use by a digital television display. Set top box 16 further comprises a generic SI engine 36, which comprises an application interface, a filtering interface, and a format specification interface, as described herein. Signals sent to the set top box 16 are filtered by the transport stage 28 under the direction of the generic SI engine 36, and of those that meet the filtering requirements, some may be used by the processor 30 immediately, while others may be placed in local storage such as RAM or storage device 18. Examples of requirements that would need to be filtered for include a particular value in the location reserved for an elementary stream identifier or an originating network identifier. The set top box 16 may be used to overlay or combine different signals to form the desired display on the viewer's television 20.

The audio-video signals and program control signals received by the set top box 16 correspond to television programs and menu selections that the viewer may access through a user interface, as well as applications that may be executed, e.g., interpreted, by the control processor 30. The viewer may control the set top box 16 through an infrared remote control unit, a control panel on the set top box, or a menu displayed on the television screen, for example. Selections and entries made by the viewer may in turn cause applications to change their filtering requirements, and send requests to the SI engine 36 to change the masks for the filters and receive information based on the modified filtering requirements.

The set top box 16 may be capable of decoding video, audio, and data. In one embodiment, it may be a digital set top box for use with a satellite receiver or satellite integrated decoder receiver that is capable of decoding MPEG video, audio, and data. The set top box 16 may be configured, for example, to receive digital video channels that support broadband communications using Quadrature Amplitude Modulation (QAM) and to control channels for two-way signaling and messaging. The digital QAM channels carry compressed and encoded multiprogram MPEG (Motion Picture Expert Group) transport streams. A transport stage 28 extracts the desired program from the transport stream and separates the audio, video, and data components, which are routed to devices that process the streams, such as one or more audio decoders, one or more video decoders, and optionally to RAM (or other form of memory) or a hard drive. It is to be understood that the set top box 16 and storage device 18 (as well as any data and signals from the broadcast service provider) may be analog, digital, or both analog and digital.

Storage device 18 is optionally coupled to the set top box 16. The storage device 18 is used to provide sufficient storage to record programs and data that will not fit in the limited amount of main memory (e.g., RAM) typically available in set top boxes. The storage device 18 may comprise any suitable storage device, such as a hard disk drive, a recordable DVD drive, magnetic tape, optical disk, magneto-optical disk, flash memory, or solid state memory, for example. The storage device 18 may be internal to the set top box 16 or connected externally (e.g., through an IEEE 1394-1995 connection) with either a permanent connection or a removable connection. More than one storage device 18 may be attached to the set top box 16. The set top box 16 and/or storage device 18 may also be included in one package with the television set 20.

The set top box 16 generally includes a control processor 30 comprised of a control unit (e.g., microprocessor), main memory (e.g., RAM), and other components which are necessary to process the received interactive television signal.

As shown in FIG. 5, the set top box 16 includes a front end 26 operable to receive audio, video, and other data from the broadcast station 12. The broadcast source is fed into the set top box 16 at the front end 26, which comprises an analog to digital (A/D) converter and tuner/demodulators (not shown). The front end 26 filters out a particular band of frequencies, demodulates it, and converts it to a digital format. The digitized output is then sent to a transport stage 28. The transport stage 28 further processes the data, sending a portion of the data to an audio-visual (AV) stage 34 for display and another portion to the control processor 30, and filtering out the rest of the data. Signaling and control information may also be recorded as broadcast along with the audio-video data or may be first manipulated by software within the set top box 16.

It is to be understood that the system 10 described herein is only one example of a system used to convey signals to the television 20. The broadcast network system and set top box 16 may be different than described herein without departing from the scope of the invention. For example, various components depicted in the set top box 16 of FIG. 5 may be combined, such as the placement of SI engine 36 within processor 30 or partially in the transport stage 28 and the control processor 30, or the integration of storage device 18 within set top box 16.

The Generic SI Engine

Construction of the generic SI engine involves the following:

- Defining/selecting a language to express the syntax of the SI or formatted metadata.
- Defining/selecting a language to express the semantics of the SI metadata. This language may be the same language as that defined for expressing the syntax, an extension of the language defined for expressing the syntax, or a different language.
- Defining/selecting a language to express SI queries. This language may be the same as the language(s) defined for expressing syntax and semantics, an extension, or a different language.
- Constructing a generic SI engine that understands SI descriptions written in the language(s) for expressing syntax and semantics, and can use those descriptions to obtain SI information in response to an application program's request. In an embodiment of the invention, the generic SI engine is configured to convert transmitted versions of the SI syntax and SI semantics definition into internal representations to be stored by the SI engine. The generic SI engine is further configured to use the structure of the internal representations of the SI definition(s) to respond to queries for SI.

One skilled in the art will note that the above steps do not need to be performed in the order listed above.

Accordingly, in an embodiment of the invention, a language for expressing the syntax and semantics of an SI definition is defined, although another embodiment could use separate languages for the syntax and semantics. This language for the syntax and semantics is used to express the format in which the SI data will be transmitted, as well as the relationships between data in the same or different transmitted structures. Also defined is a method for intelligently processing the SI specification(s) that are written in that language or those languages. In addition to one or more languages for specifying the syntax and semantics of the SI format, a language is required for use by applications in making requests for particular SI data. The applications' requests must correspond to terms identified in the syntax and semantic definitions so that the generic SI engine can produce masks and filter and further process data to be returned to the application.

Figure 6:
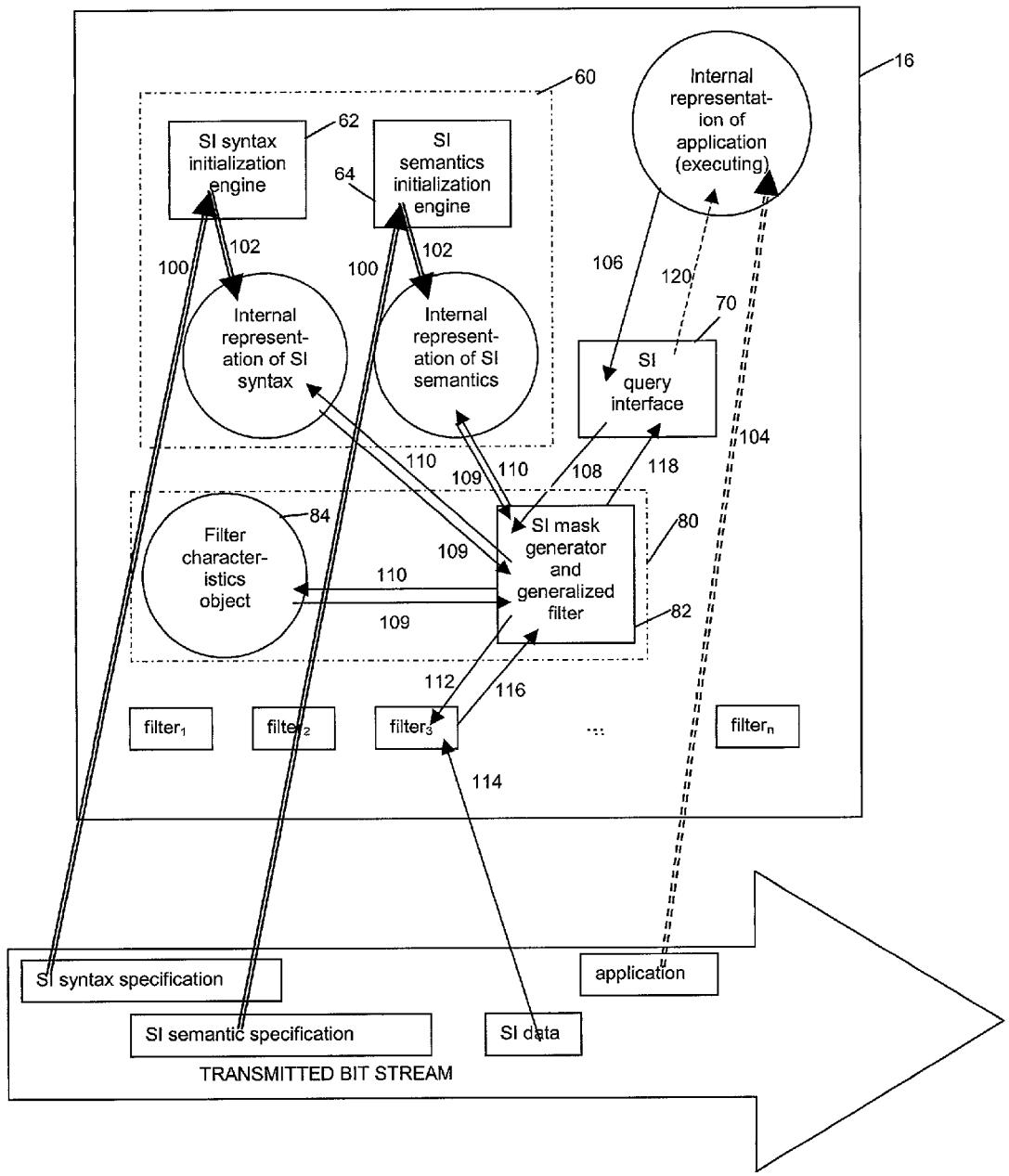
FIG. 6 is a diagram illustrating an embodiment of the functional components of a generic SI engine and their interaction.

FIG. 6 illustrates the architecture of a generic SI engine 36 in an embodiment of the invention. The generic SI engine 36, which is shown within set top box 16 but could be implemented in another type of IRD or placed inside a television, comprises a format specification interface 60, an application interface 70, and a filter interface 80.

In one embodiment, the reconfiguration of the generic SI engine proceeds as follows. When the generic SI engine receives a description of a new SI format or a description of an enhancement to an existing SI format, it will use the description to create a set of data structures. These data structures can be used to configure, or to re-configure, the generic SI engine and can be used by the generic SI engine to determine how to handle requests from applications for SI data, and how to handle data received from the filters.

In one embodiment, when the generic SI engine receives a request from an application for particular SI data, the generic SI engine uses the above-mentioned data structures and other data structures stored in the IRD to determine how the filters in the IRD can be best used to acquire either the information requested by the application, or a superset of that information. The application's request is converted by the SI query interface 70 to a series of requests (one or more) to be made to the SI mask generator and generalized filter 82. In response to each of these requests, the SI mask generator and generalized filter 82 creates a mask or a set of masks, and chooses one or more sets of filters inside the IRD to use these masks. There may be different types of filters present, each designed to efficiently filter information that has been encoded in a particular system encoding format such as MPEG or DSS, for example. The application's request includes, either implicitly (because this lower level information can be defined by the SI specifications) or explicitly, the particular system encoding format or formats that are to be used as well as the transport encoding, such as MPEG-2 or DSS, in which the data is encoded. The filters may be either hardware or software or a combination of both. The filters use the masks to determine which data to return to the SI mask generator and generalized filter 82 for further processing, ignoring any data that does not match or fall within a range specified by the masks.

In one embodiment, upon receipt of data from the filters, the SI mask generator and generalized filter 82 uses the data structures that describe the SI syntax and semantics, along with the current outstanding queries, to determine what additional filtering and processing may be needed before returning results to the requesting application. For example, the filters may be capable of filtering only on a certain subset of the bits, leaving the generic SI engine to perform the remaining filtering. The capabilities of the particular filters could be stored in data structures associated with each filter type, for example, in a filter characteristics object 84. In addition, information returned from the filters may be parsed by the SI mask generator and generalized filter 82 to determine that additional data, requiring additional setup of masks and filters, is needed. Therefore, the returned data may not be returned immediately or at all to the application, but instead may be used to determine additional masks for use by the filters. Eventually, the SI mask generator and generalized filter 82 would receive all of the data needed to satisfy the application's request and cache/store it or return it to the application, possibly after applying further processing to the data. The information may be cached in RAM or in local storage such as storage device 18.

In one embodiment, the filters may be configured to autonomously locate and isolate information required by the application, and return the requested information directly to the application rather than passing it through the SI engine. Additionally, depending upon the type of request, the SI engine could simply store a particular type of data sought by the application until the data is later specifically requested by the application.

The format specification interface 60 comprises an SI syntax initialization engine 62 and an SI semantics initialization engine 64. The SI syntax initialization engine 62 includes a lexical analyzer, parser, and initialization engine configured to process descriptions written in the language chosen or created to specify SI syntax. Similarly, the SI semantics initialization engine 64 includes a lexical analyzer, parser, and initialization engine configured to process descriptions written in the language chosen or created to specify SI semantics. If the same language is used to express both the syntax and semantics of the SI, then both the SI syntax initialization engine 62 and SI semantics initialization engine 64 may share some of the same components. Independent of whether the SI syntax language is the same as the SI semantics language, the internal representations may be kept as distinct entities or may be merged.

In one embodiment, the application interface 70, which is also referred to as an SI query interface, may comprise a lexical analyzer and a parser for processing queries from applications. These queries request SI data to be returned to the applications, or cached. If the language for describing the SI queries is the same as the language used to describe SI syntax and/or SI semantics, it may share, for example, the implementation of the lexical analyzer and parser with the SI syntax initialization engine 62 and/or SI semantics initialization engine 64, respectively. The same instance may be used, if written with appropriate synchronization.

As shown in FIG. 6, the filter interface 80 comprises an SI mask generator and generic filter 82, and a filter characteristics object 84. The SI mask generator and generic filter 82 may be controlled by the parser in the SI query interface 70. The filter characteristics object 84 is a structure or object that includes a description of the lower-level filter capabilities of the IRD, which may include, for example, (i) the packet sizes associated with the filter; (ii) the number of bytes into the packet for which hardware filtering is available; and/or (iii) whether the filters can be configured to reject certain bit patterns rather than to accept certain bit patterns.

It should be understood that the above-described components may be implemented as different modules within a single process, as an integrated whole, or as any combination thereof. They may also be further subdivided into more components. If implemented as multiple modules, they may be instantiated as separate threads within a single executing program, or as separate programs that communicate with one another or are placed together in a single thread of an executing program. Additionally, the three languages (for specifying SI syntax, semantics, and queries) may be combined into one or two languages, or expressed as more than three languages.

FIG. 6 illustrates, using arrows, the interactions of various components with each other in the SI engine. A broadcast service provider or system operator transmits a stream comprising a description of the SI syntax and semantics, SI data, application data (including code), audio, video, and various other information. It should be noted that the stream may not necessarily contain all of this information at the same time. Upon reception of the transmitted bit stream by the IRD, step 100, the SI syntax initialization engine 62 and the SI semantics initialization engine 64 will convert their respective SI descriptions to one or more internal representations that can be used by various other components of the SI engine, as indicated by step 102 in FIG. 6.

The transmitted bit stream may contain application code, which is extracted from the bit stream for execution by the IRD, step 104. Alternatively, the application may already exist in the IRD or may have been recently received from the transmitted bit stream. When the application begins execution, it may issue queries (also referred to as requests) for particular SI data, as indicated by step 106, and the queries are delivered to the SI query interface 70. The requests may be synchronous (the application halts and awaits a response) or asynchronous (the application continues execution, performing other tasks, until it either stops for some other reason or it receives a response). The requests may also be discrete or continuous. A discrete request is one in which the first n instances of the requested information are required by the application, where n is an integer greater than or equal to 1. A continuous request is one in which the application desires to have new versions of the requested information continuously returned to it until it cancels the request. In addition, the application's query may be classified as either a request for data to be returned as soon as possible or as a request for the SI engine to cache particular SI data, as resources permit (such as in RAM or storage device 18). Any cached data may then be requested at a later time.

In an embodiment of the invention, the SI query interface 70 transmits the requests to the SI mask generator and generic filter 82, step 108. The SI mask generator and generic filter 82 may use information stored in the SI syntax internal representation, SI semantics internal representation, and filter characteristics object (steps 109 and 110) to build a sequence of one or more queries. For example, the application may ask for all electronic program guide information, which may correspond to having either a 01 or a 10 bit pattern starting at the third byte of a packet. In response, for one type of machine, the SI mask generator and generic filter 82 may build two masks, one for the "01" bit pattern and one for the "10" bit pattern, and assign each to a different hardware filter. The masks may also be used to search for tags, such as XML tags, having specified values. On a different type of machine, a single hardware filter may be capable of simultaneously looking for packets that match either mask.

This sequence of queries may be modified as information is returned from the filters in the flow indicated by 116. Alternatively, the queries may be built by the SI query interface 70, using additional lines of communication (not shown) between the SI query interface 70 and the format specification interface 60 or the SI mask generator and generic filter 82 may be combined with SI query interface 70.

The SI mask generator and generic filter 82, possibly after obtaining information from the internal representations of the SI descriptions and the filter description, will compose appropriate masks and assign them to the appropriate filters, as indicated at 112. The filters, which may be completely or partially implemented in hardware or software, use the masks to obtain the requested SI data from the transmitted bit stream, step 114. The filtered SI data is then returned to the SI mask generator and generic filter 82, shown by flow 116. Alternatively, the filtered SI data could be returned directly to applications through an interrupt handling mechanism or by polling. After receiving the SI data, the SI mask generator and generic filter 82 may further filter the information before returning it to the SI query interface 70, step 118. As stated above, the SI query interface 70 and SI mask generator and generic filter 82 may be implemented as a single component, in which case the SI query interface 70 (comprising the SI mask generator and generic filter) would perform the further filtering.

When SI query interface 70 receives the SI data, it examines the information and can take any combination of the following actions:

Make another request to the SI mask generator and generic filter 82, based upon the values returned by the SI mask generator and generic filter 82 thus far, step 108.

Make another request of the SI mask generator and generic filter 82, independent of the values returned thus far. Step 108.

Pass the returned information, possibly combined with previously returned information or a subset thereof, back to the application making the query, step 120.

Cache part or all of the returned information, as resources permit. Caching may be done directly by the SI mask generator and generic filter 82, the SI query interface 70, or by a module dedicated to allocate resources for caching and perform the caching.

Cancel the request to the SI mask generator and generic filter 82 so that the filters can be reused for another purpose.

After the information is delivered to the application in step 120, the application can cancel the request that produced the information or leave the request open if the request was continuous. If the request was discrete, and the SI query interface 70 has returned the requested number of versions (which, in many cases will be one), or the application requests cancellation, the SI query interface 70 will cancel the request to the SI mask generator and generic filter 82, which in turn will release the filters.

An example of an SI syntax specification language usable in accordance with the invention will be described below. The disclosed embodiment is but one example of many possible languages that may be used. It is presented as one possible implementation, and should not be read as in any way limiting the scope of the invention.

The syntax of a simple language, which would allow nearly verbatim entry from many of the existing SI definition documents, can be expressed in extended BNF (Backus-Naur Form) as shown in FIG. 7. As is typical, λ signifies the empty string and literals are enclosed in quote marks " ". FIG. 8 illustrates a description written in this syntax. This description partially defines a DVB (Digital Video Broadcasting) SI MPEG section containing a Network Information Subtable. If a generic SI engine 36 were already in place at the receiver end (e.g. in an IRD, television, or other device), then some encoding, perhaps according to ASCII or unicode, of the textual definition of FIG. 8 would be transmitted (such as by broadcast, point-to-point, etc.) to the receiver, perhaps as a MPEG-2 private section.

Referring again to FIG. 8, the definition of the Network Information Subtable assumes that MPEG is used as the system encoding of the bit stream. In this encoding, the existence of the Network Information Subtable is signaled by setting the MPEG-defined field called PID (packet identifier) to the value 8. The definition also shows that this section is recognizable by a section's table_id value of 64 or 65. Both the PID value and the table_id value are used in this SI language because filters must be able to locate partial subtables that are identifiable only by PID values, and are not identifiable by table_id values (such as if the subtable is too large to fit in a single packet). The lengths of each field are given in number of bits. Both "bslbf" and "uimsbf" are listed as basic types in the internal table, with which the engine would have been initialized, that describes MPEG, one of a few commonly used standards.

This example shows loops within loops. Because the scope of the loop lengths is within the current loop or structure, no "." notation is necessary to identify the loop length. Two of the loops, the first and the third (which is nested inside the second), can contain descriptors, which can be any of the ones listed under "alternate" because they are known as NITDescriptor. It happens that in the DVB SI definition any of a long list of descriptors is possible in numerous places in most of the subtables (the term that DVB uses for the structures in question, though they may not necessarily be in tabular format). However, the language that is used here allows for the possibility of having restrictions on the types of subtables in which descriptors may appear. It will be apparent to one skilled in the art that the example shown in FIG. 8 is only a partial description. Fields such as network_name_descriptor and data_broadcast_id_descriptor would need to be further refined, and the other subtables would need to be defined and the exact list of descriptors would be needed.

The language discussed herein is only a very simple example of a language that could be used to express SI syntax, and there are many possible extensions and modifications that would cause or allow people to write either longer or shorter descriptions of particular SI specifications. For example, the above language may be enhanced to include inheritance so that one table could be defined to be nearly identical to another table, with certain fields overwritten. Additionally, an enhancement of the language could allow a person to write all of the possible tables in which a new descriptor could appear, rather than having to add that new descriptor to all appropriate structures representing groups of alternate descriptors for each given table.

One possible implementation of an SI syntax initialization engine 62 would be a program that reads a description given in a language similar to the one discussed above and creates data structures similar to those illustrated in FIG. 9, using techniques well known in the art. The data structures may be dynamically allocated and populated with information, such as that from FIG. 8, and can hold anything expressible in the language of FIG. 7. These data structures correspond to the internal representation of the SI syntax and would later be accessed by the mask generator and generic filter 82, along with possibly information from the filter characteristics object 84, to enable it to locate requested fields in a string of bits as well as to set up masks for lower-level filters.

Because of the large amount of data in a typical digital television broadcast stream, it is currently impractical to examine, within either the application software or the SI engine, all of the SI data contained within the stream. Thus, the disclosure herein provides the ability for applications to make two different types of requests to the lower level software. The first type of request results in data being returned to the application. The application requests that specific structures, which may be simple or very complex, be returned to the application software if they have particular values in specified fields. The middle layer software would then set masks that the lowest level hardware (and possibly software) filters would use to limit the number of candidates that must be further parsed and filtered by the middle layer, before returning the requested structures to the application software.

The second type of request is known as a caching request. A caching request is almost identical to the first type of request, except that the structures pulled from the transmitted stream are not immediately returned to the application software. Instead these structures would be cached, as time, space, and allocation of hardware filters permit, by the middle layer (for example, in RAM, in storage device 18, etc). Values cached could then be used as an additional source of information when an application makes a request of the first type.

Therefore, a language in which to make these requests is necessary, although the concepts of this invention are not dependent upon any particular language choice. It is only necessary that the language enable the application programmer to exactly specify the structures that must be returned or cached. A range of approaches could be taken in designing the language for the application programmer to use. Any specific approach is characterized by the amount of knowledge that the application programmer must have concerning the meaning associated with the SI syntax.

At one end of the spectrum, the application programmer understands everything about the part of the SI syntax and semantics that the broadcaster or system operator is using and uses that understanding to specifically request structures and fields from those structures. At the other end of the spectrum, the programmer understands nothing about the SI syntax or particular underlying semantics, because the broadcaster or operator has given meaning to higher level terms, which are expressed in the lower level SI syntax and semantics. Using this second model, the application programmer would request information using only these higher level terms.

An embodiment of the invention may use an implementation somewhere between these two extremes. Using such an intermediate approach, the broadcaster or system operator would define some high level terms that the application programmer can use to request common types of SI data. Additionally, under this approach, the application programmer would have the flexibility to request less common information by using knowledge of the underlying SI format. Examples of these approaches are disclosed herein.

Several embodiments of query and SI semantic specification languages are disclosed below, along with descriptions of SI query interfaces 70 and SI semantics initialization engines 64 usable with the languages. These embodiments are presented for the purpose of illustrating the concepts of the invention, and are based on the assumption that the SI syntax is specified in the SI syntax specification language described above and in FIG. 7. It should be understood that any other language powerful enough to describe the SI syntax may be used, and in such languages, a convention depending upon the SI syntax specification language might be adopted. For example, network_information_section.loop_2.loop_1.transport_stream_id would refer to a transport_stream_id value inside the first loop that is inside the second loop of a network_information_section. As another example, network_information_section.loop_1.descriptor.service_list_descriptor would refer to a collection of all of the fields of a service_list_descriptor that would be found within the first loop of a network_information_section, whereas network_information_section.loop_1.descriptor.service_list_descriptor.service_id would refer to only the service_id field of that same descriptor. Extensions to the conventions suggested above may be used to permit the identification of a particular SI element. Additionally, if scoping rules are needed, they could be implicit or explicit. An example where scoping rules are used is now shown. Consider the case where the following two references exist:

network_information_section.loop_1=named_loop.descriptor.service_list_descriptor
named_loop.descriptor.satellite_delivery_descriptor If they appear within the same scope, this example indicates that both descriptors must appear in the same loop of a network_information_section. In contrast, placing the following two references in a different scope would mean the same as the following:

network_information_section.loop_1.descriptor.service_list_descriptor
network_information_section.loop_1.descriptor.satellite_delivery_descriptor This latter example refers to two different descriptors, which may occur in the same instantiation or a different instantiation of the loop_1.

In one embodiment, a high-level query language may be coupled with an appropriate SI semantics language. For this approach, two additional languages are used. The first language, which is called the SI semantics language, would typically be used by the broadcaster or operator or their representatives and contractors to specify meanings for commonly used objects in their SI representation. The second language, which is referred to as the query language, makes use of terms defined by the broadcaster in the SI semantics language. The second language allows the application programmer to query for information from the SI internal representations in the generic SI engine 36 without requiring the application programmer to know how the information is stored within the SI structures.

To further illustrate this embodiment, consider an example scenario that demonstrates the usage of an SI semantics language that complements a high-level query language. Keywords of the two languages are represented in bold in this example. Suppose that the viewer has pulled up a "configure TV guide menu" that is available as an application on the set top box (or TV or other device used for interactive TV). This application may be either downloaded on demand from the broadcast stream, downloaded from the Internet or point-to-point connection, or already be cached in the viewer's set top box. In this example, the viewer has heard that there will be a John Wayne festival on channel 17 sometime in the next couple of days and wants to determine whether there will be any John Wayne movies, particularly any produced by the Metro-Goldwyn-Mayer production company, being shown between 7 am and 1:30 pm of the current day. After the viewer chooses items from appropriate menus and perhaps enters information (using a remote control, keyboard, or other input device), the application formulates the following call to the underlying software:

Success=O_si_query("acquire eventInfo where channel (=, 17) and startTime (>=, 25,200) and endTime (<=, 48,600) and eventType (=, Movie) and itemPair (=, Actor, =, 'John Wayne') and itemPair (=, ProductionCompany, =, 'MetroGoldwynMayr')", &event);

In this example, the application has converted the start and end time to number of seconds past midnight of the current day. The query is the component enclosed in double quote marks, " ". The remainder of the statement above represents one way in which the query may be used within an application programmer's interface (API).

Some simplifying assumptions are made in this illustration. The SI that the broadcaster is using for this example is very similar to DVB SI, though one difference is that all times are expressed as the number of seconds past midnight, local time. Also, DVB SI itself provides no way to associate what the viewer thinks of as a channel number (that the viewer enters with the remote control, for example) to the triplet that DVB SI usually uses to identify a service; i.e. the service identifier, the original network identifier, and the transport stream identifier or the values used in a similar ATSC table. Therefore, for this illustration, it is assumed that the broadcaster has defined its own sections, called channel correspondence sections, whose purpose is to associate the viewer's concept of a channel number with values for this triplet (or the ATSC values).

The broadcaster or operator will have already written, using their identified language, and broadcast to IRDs, a translation of the terms used by the application writer to define a set of constants, in this case Movie, Actor, and ProductionCompany, and an object type, eventInfo, as shown in FIGS. 10a and 10b. The definition of eventInfo indicates that an event_information_section is obtained and particular fields of the requested object are returned. Incorporated in one of the field definitions is a compute keyword. This is an indication that end_time is not obtained directly from the fields in the table fetched from the stream, but is calculated based upon them. The statements below the word where define various methods which, when requested by an application in this case, result in narrowing the candidates for the values to be returned to the caller. As shown, not all methods need to be used by a particular query, and a method can be used multiple times, as with the instantiate method. A compute statement, as explained later, may consist of operands and the operators +, −, *, /, div, mod, min, and max. Therefore, the calculations can be performed using a simple stack structure incorporated within the SI engine 36.

A grammar that defines the syntax for the example SI semantics language will be described. The tokens are defined as follows:

DEFINE="Define", OBTAIN="obtain", EQUALS="=", GT=">", LT="<", NOTEQUALS="!=", GTEQ="≧=", LTEQ="≦=", SMEICOLON=";", STRINGTYPE="string", INTTYPE="int", OBJECT="Object", LEFTCURLY="{", RIGHTCURLY="}", FETCH="fetch", RETURN="return", COLON=":", ASSIGNOP=":=", LSQUARE="[", RSQUARE="]", DOT=".", PLUS="+", MINUS="−", TIMES="*", DIV="div", MOD="mod", MIN="min", MAX="max", RELOP="relop", SET="set", FILTER="filter", COMPUTE="compute", LPAREN="(", COMMA=",", RPAREN=")", WHERE="where", DBLEQUALS="==" INTEGER=digit (digit)*, STRING=""(any_char_except_')* "", and VARIABLE=letter (any_letter_or_digit_or_underscore)*.

In the above definition, digit stands for any of the characters 0 . . . 9, any_letter_or_digit_or_underscore stands for any character that is a letter in the range a . . . z or A . . . Z or 0 . . . 9. The term any_char_except_' stands for any character except the single quote. The symbol * in the above definitions of the tokens means "any number (even 0) of the parenthesized items can be included."

The non-terminals are defined in a version of BNF, as illustrated in FIGS. 11*a* and 11*b*. The non-terminal Program is the initial goal. As usual, λ refers to the empty string, and the symbol "|" means that the non-terminal can be replaced by either the expression to the left of the "|" or the expression to the right.

A corresponding SI semantics initialization engine 64 will now be described. Using the grammar defined in FIGS. 11*a* and 11*b*, the broadcaster or operator can describe new, higher-level structures that include fields chosen from the original SI structures. The purpose of the SI semantics initialization engine 64 is to parse a set of descriptions of the higher level structures and store an internal representation of the descriptions in a structure. This internal representation structure is used by the SI mask generator and generic filter 82 (or possibly by the query interface 70, as stated above) to determine exactly which SI data to obtain, based upon the application's query. Therefore, all that is needed is code that reads the data in the form of the grammar and stores it in a form from which it can later be retrieved.

An example of a structure that might thus be generated by the SI semantics initialization engine 64 is shown in FIGS. 12*a*, 12*b*, and 12*c* in a C-like notation. The pointer PtrTo-Defns is initialized by the SI semantics initialization engine 64. This pointer contains the address of the first element of a list of definitions. Each definition points to the next. Similarly, each definition states whether it is a definition of an integer, a string, or a new object. If it is an integer or string, then it is a constant definition, so the definition stores the actual value. Otherwise, it stores the structure of the new object that is being defined. This new object includes pointers to other structures that must be acquired, pointers to information about methods to invoke those other objects, pointers to structures containing new names for values that are returned, and a list of pointers to filters that will be set for objects that will be acquired later. Each of these object elements is complex enough to hold all of the information in the SI semantic description that is sent in the transmission stream. At the same time, they are simple enough to be traversed to determine SI objects that must be obtained and to determine filters on those SI objects that should be used in order to obtain the actual values for the higher-level objects that are defined in this language.

As has been stated above, the query language, which is used by applications, is very simple in this case. Its grammar is very close to a subset of the above SI semantics language, where each invocation from the application program corresponds to something similar to an obtain expression. The query language differs in that either acquire or cache can be used in place of obtain. The keyword acquire can be used to indicate that the application wants the requested SI data to be returned when found. On the other hand, cache would be used to indicate that the SI engine 36 should cache this type of SI data, resources permitting, and that the application would later execute an acquire statement in order to obtain it. The grammar for the corresponding query language, therefore, may look similar to description below.

Query::=Request ObjName OptConstraint

Request::="acquire" | "cache"

ObjName::=VARIABLE

OptConstraint::=WHERE OptNot OptConstraints

OptConstraints::=λ| Constraint Connector OptNot OptConstraints

Constraint::=MethodName LPAREN ActualParamList RPAREN

ActualParamList::=ActualParam OptMoreActualParams

OptMoreActualParams::=λ| COMMA ActualParam OptMoreActualParams

ActualParam::=VARIABLE | INTEGER |Comparator

Comparator::=DBLEQUALS | GT | GTEQ | LTEQ | LT | NOTEQUALS

Connector::="and" |"or"

OptNot::=λ| "not"

As before, this embodiment has been presented for the purpose of illustration, and it should be reiterated that there are an infinite number of possibilities for such a language. For example, the language described here includes both the AND and OR logical connectors, as well as the optional logical NOT, where various subsets of these connectors would have sufficed (e.g. OR can be expressed as a combination of AND and NOT functions, because OR is equivalent to AND-NOT with all inputs negated).

The corresponding SI query interface may be invoked through an API that contains a string formatted according to the SI query language above. The API may also allow for either synchronous or asynchronous requests from the application programmer. A synchronous request pauses the application program until the SI value is obtained and returned. An asynchronous request allows the program to continue immediately. In either case, the application program may use the API to specify where to store the returned SI data, if any. If the application program has previously requested that certain types of SI data be cached, then a later request to obtain data might result in checking the cached location before fetching any new SI data. In all of these situations, the SI query interface would parse the request. The SI query interface 70 or the SI mask generator and generic filter 82 would use knowledge of the structure described above to locate the description of the high-level object that was requested in the query. It would then use this description, which might indicate that a set of intermediate or multiple structures be obtained from the SI data, in order to create the higher-level structure requested by the application.

In an embodiment of the invention, the query language may be implemented as a low-level language. Using a low-level query language, the application programmer could request specific SI data using knowledge of the structure of the broadcast SI. FIG. 13 demonstrates how such a language may be used to construct a query. The television viewer, who might be busy for the next few hours, may desire to record some interesting news programs in the meantime. Therefore, the viewer may want to see a list of such programs that will be offered on the "basic service" to which he/she subscribes, represented by a particular bouquet (group of channels). This basic service may consist of some channels that are carried via satellite and other channels that are carried via cable. Therefore, the viewer will need to configure the IRD to either cable or satellite, depending upon the shows that are being offered. Using an appropriate user interface, the viewer may indicate an interest in "news" programs, the time period of interest (RequestedStartTime and RequestedEndTime), that he/she is interested only in networks that are transmitted via cable (if they have configured for cable), and that the networks must be included in the "basic service." These choices may, for example, be presented in a pull-down menu or other suitable format. The viewer's selections would be translated into a query that is somewhat SQL-like, as shown in FIG. 13.

The illustrated query asks that all of the contents from each instantiation of the first loop of an event_information_section be returned to the application, if constraints are met on both: (i) some fields of the event_information_section that are outside of the loop; and (ii) some fields that are inside that loop. The fields that are pertinent outside of the loop include the original_network_id and the transport_stream_id. These two fields serve to uniquely identify any transport stream from any other. By knowing these values, it is possible to use information in other tables to determine, for example, whether a particular transport stream is carried over cable or via satellite and to what bouquets that transport stream belongs. Information inside of the referenced loop is specific to a particular event, allowing determination as to the start time and duration of the event, the type of the event (e.g., whether it is a drama, a sporting event, or a news event), the title, producer, and in some cases individual actors that appear in the event.

Figure 14:
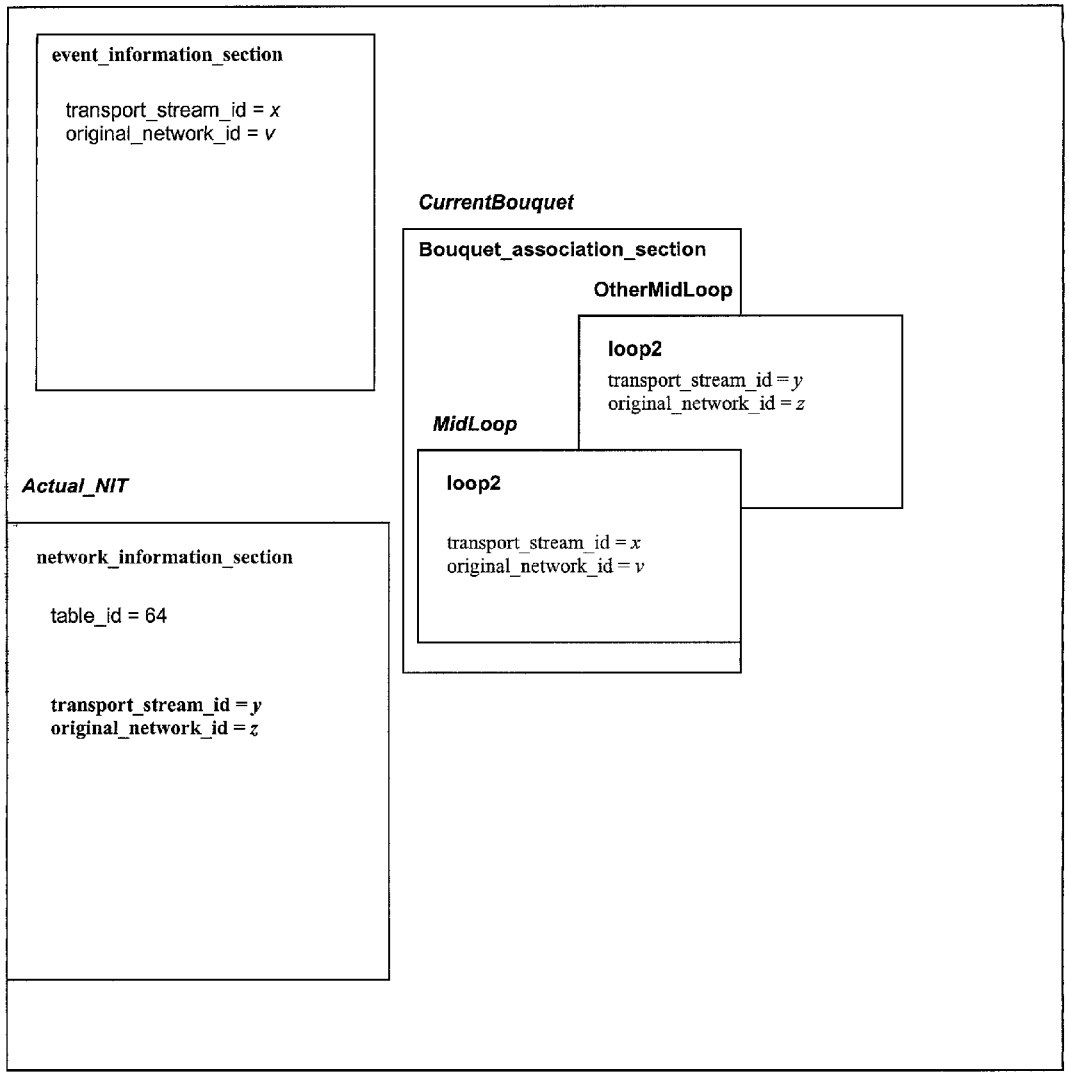
FIG. 14 is a block diagram showing the relationship between several SI structures described in the application request shown in FIG. 13.

The first segment expressing such constraints ensures that only events that are in the category of a news program are returned. The second constraint segment is more complex, as illustrated by FIG. 14. The transport_stream_id and original_network_id found in the event_information_section must be identical to that found in an instantiation of the second loop of a bouquet_association_section. However, not just any bouquet_association_section will suffice. The bouquet_association_section in which this transport_stream_id and original_network_id are found must be the same bouquet_association_section that contains a transport_stream_id and original_network_id whose values are identical to those found in a network_information_section for the current transport stream. The loop in which this second pair of transport_stream_id and original_network_id are found may be the same loop in which the first pair was found; i.e., in the figure x=y and v=z. Rather than generating this compound query, the application could have first queried for the original_network_id and transport_stream_id in the current transport stream's network_information_section. Using these pieces of information, it could then have queried for the bouquet_id corresponding to the current transport stream, and for the set of all pairs of original_network_id and transport_stream_id in the bouquet with that bouquet_id. The application could have restricted the set of these to those carried on cable (as will be discussed below), and, finally, it could restrict the events according to category and time.

The third constraint defines the requirement that the transport stream must be accessible via cable. That is, the transport_stream_id and original_network_id of the stream on which the event is carried must also be listed in a network_information_section that contains a cable_delivery_system_descriptor. Note that this may be the same network_information_section as referred to in the description of the second constraint. It may also be different, because the same station (i.e., transport_stream_id and original_network_id) may be rebroadcast over multiple media.

The fourth and final constraint in the example of FIG. 13 is shown in FIG. 15, which expands the "//DVB_time_Between" constraint. As can be seen by reference to the figure, these time constraints translate to constraints on the section_number fields of the event_information_sections as well as on the start_time and duration fields. The appropriate events, lying within the appropriate time spans, could be located and returned to the application without specifying the constraints on the section_number field. However, failing to specify the constraints on the section_number field would require a typical IRD to perform substantially more filtering (removing packets in which the application is not interested) in software than hardware (since the filters are usually implemented in hardware), perhaps causing it to miss (due to buffer overflow), or at least delay, packets that the application definitely needs.

One skilled in the art will recognize from the foregoing disclosure that the language in which queries are expressed for this particular type of SI must include the ability to specify the following:

from which structures information is to be extracted;
arbitrarily complex integer arithmetic operations using operands commonly found in most programming languages;
assignments;
arbitrarily complex comparisons made from the typical comparison operators: $<$, $>$, $=$(is equal to), $\geq$, and $\leq$;
arbitrarily complex logical constraints made from the typical logical operators: and, or, and not.

The SI semantics language disclosed above possesses all of these properties.

In an embodiment of the invention, it is not necessary to create a new language or set of languages to be used for specifying the SI semantics and the queries. For example, Prolog may be used. It should be understood that if Prolog, or another logic or interpreted general purpose computation language is used, the overhead at execution time may be significant, for both the SI semantics initialization engine 64 and, if it also used as the internal representation form, the SI mask generator and generalized filter 82. The IRD must have sufficient processing power to handle the required overhead.

An example of the use of Prolog for expressing the semantics of a portion of an SI definition is illustrated in FIG. 16. The first rule states that X is the current transport_stream_id if A is a program_association_table and A has a field called transport_stream_id whose value is X. The second rule defines when C is a member of the bouquet B. C is a member of the bouquet B if L is a bouquet_association_section whose field named bouquet_id has the value B and whose field named transport_stream_id has the value C. The last two rules identify the two cases in which it can be determined that the stream whose transport_stream_id is X is being sent on a particular media (i.e., cable, satellite or terrestrial). The first of the last two rules indicates that X is being transmitted via the specified media if X is the current transport_stream_id (which makes use of the first rule) and the network_information_section corresponding to the current transport stream (signified by a table_id of 32) has a descriptor in its first loop that is of type frequency_list_descriptor whose coding_type field has the value media.

FIGS. 17a-17f illustrate a slightly more complex example. FIG. 17a shows a rule that can be used to determine a list of events which can begin as early as the requested start time and which end before the requested end time (inclusive). To obtain a non-empty list of such events, at least one service on the requested transport stream must broadcast a schedule. If at least one such schedule is broadcast, a range of segment numbers must be obtained because of the way that DVB SI specifies that event information tables are divided up, up to 8 segment number values for every 3 hour interval in the day. After all of the events described in event information tables with the appropriate segment numbers are obtained, it must be verified that the actual events do lie between the requested times. This is done by the last rule shown in FIG. 17a.

FIG. 17b shows a rule to determine whether any schedules are broadcast for services on a given transport stream. FIG. 17c shows rules that can be used to obtain event information corresponding to a range of segment numbers. Because this example is based on DVB, and because of the way that DVB stipulates that segment numbers be allocated to numbers, there are two different rules. The first is for finding information in the first segment corresponding to a three hour block, and the second is for finding the rest of the information for that three hour block. Two different rules are used because some segment numbers may be unused, and it would be inefficient to have a filter or set of filters dedicated to locating information that will not be appearing in the transport stream.

FIG. 17d illustrates a number of rules that are needed to determine the difference between the current local time values given in the requested range and midnight of the current date in the UTC (Universal Time Code)-0 time zone. FIG. 17e presents the rules necessary to determine the segment numbers that correspond to particular times. Finally, FIG. 17f shows how the events are checked to determine whether they do indeed fall within the specified time period.

An SI semantics initialization engine configured to be used with the above definitions would be one that simply cached rules similar to the ones shown in FIGS. 16 and 17a through 17f. For the SI query language, if Prolog or similar language were used for expressing the SI semantics, the same language may be used to express the queries. In one embodiment, FIG. 18 shows a query that requests the titles of all news events that are to be shown on a cable channel, which is associated to the same bouquet as the show that the user is currently watching between Jun. 13, 2000 at 9:30 am and Jun. 13, 2000 at 1 pm, inclusive.

The internal SI syntax and semantics representations may be used by the SI query interface 64 in one embodiment of the invention. The SI mask generator and generic filter 82 may also use the internal SI syntax and semantics representations. The languages and structures discussed herein may be used to specify the structure of SI data and to store that SI structure specification, though there are many different ways to specify a SI structure and to store the specification. No matter what structures are used to store the SI specification, in this application the stored version of the specification has been referred to as a SI syntax specification internal representation.

Figure 19:
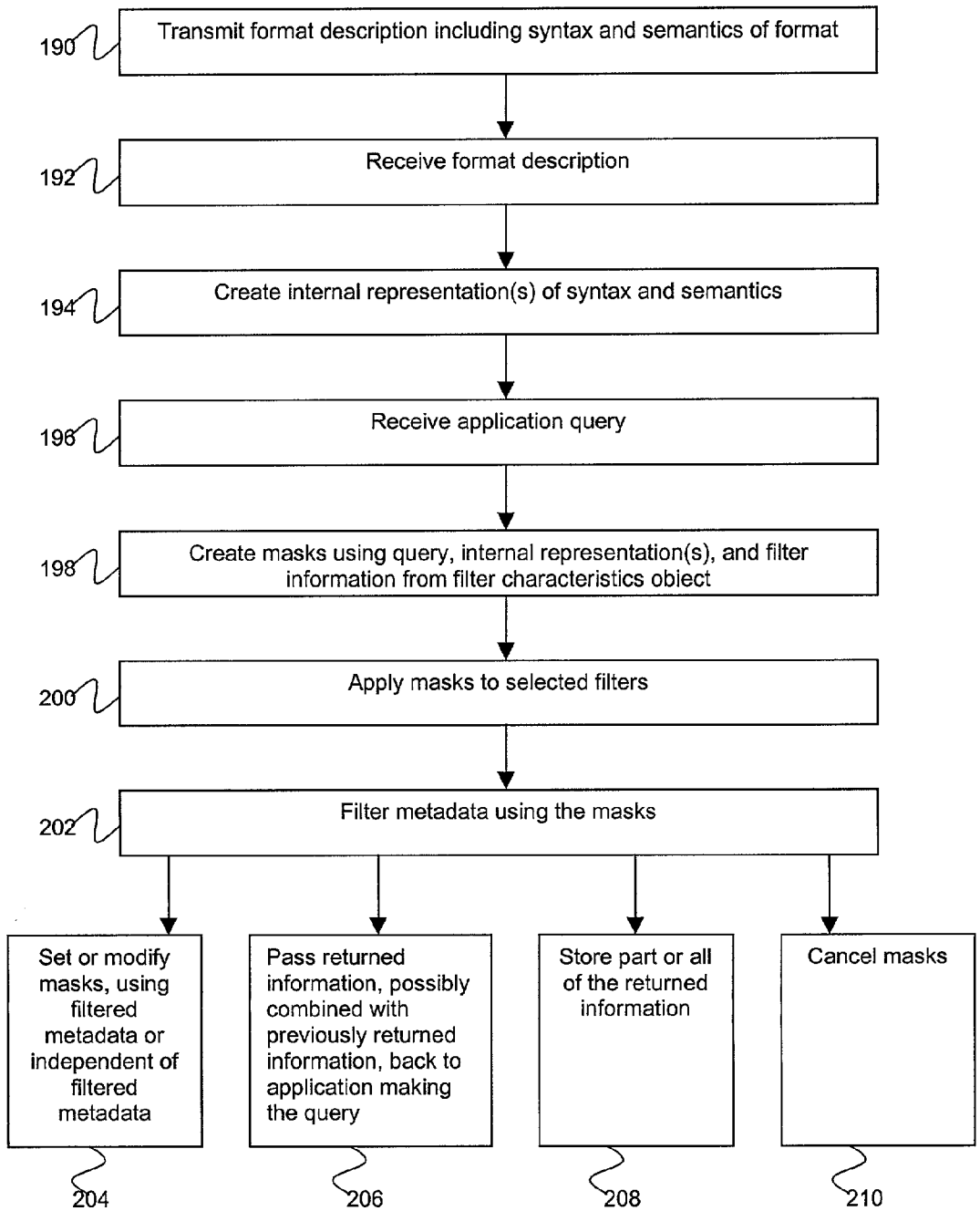
FIG. 19 illustrates a process flow in accordance with the invention.

The methods of the present invention may be summarized as shown in FIG. 19. In step 190, the format description is transmitted, including the syntax and semantics of the format. The format description is received, in step 192. An internal representation or representations (such as if different languages are used for both) of the syntax and semantics will be created, step 194. An application query is received in step 196, and then using the query, internal representation(s), and filter information (which may be stored in a filter characteristics object), a mask or set of masks will be created, step 198. The masks are applied to selected filters in step 200, and the metadata is filtered using the masks in step 202. Several steps are possible after the information has been collected. The information may be used to set or modify masks, or masks may be set or modified independent of the filtered metadata, as shown in step 204. The returned information may be passed back to the application making the query, either by itself or in combination with previously returned (and stored/cached) information, step 206. Part or all of the returned information may be stored, in step 208. The masks may also be canceled, step 210.

A reconfigurable engine for processing formatted metadata has been disclosed. The engine may be implemented in software, hardware, or a combination thereof. If any part of the invention is implemented in software, that software may be stored in some form of computer-readable medium, such as memory or CD-ROM, or transmitted over a network, and executed by a processor. Additionally, where methods have been disclosed, various sequences of steps may be possible, and it may be possible to perform such steps simultaneously, without departing from the scope of the invention.

Although the present invention has been described in accordance with the embodiments shown, one of ordinary skill in the art will readily recognize that there could be variations made to the embodiments without departing from the scope of the present invention. For example, the reconfigurable engine may be used to process any rigidly formatted data, and is not limited to SI or television-related metadata. Accordingly, it is intended that all matter contained in the above description and shown in the accompanying drawings shall be interpreted as illustrative and not in a limiting sense.

What is claimed is:

1. A receiver for processing data, wherein said receiver comprises:
    a front end configured to receive a broadcast signal including a format definition expressed in a Backus Naur Form, wherein said format definition comprises a description of a grammar which defines a syntax of a target language; and
    a generic data processing engine configured to:
        receive said format definition;
        receive additional data which conforms to the target language; produce an internal representation of the syntax and semantics; create at least one mask for use in processing additional data, the mask being based upon said internal representation; and
        process the additionally received data in accordance with the format definition using the mask.

2. The receiver as recited in claim 1, wherein the receiver is further configured to receive a broadcast including the received data.

3. The receiver as recited in claim 2, wherein the engine is further configured to receive the format definition from the broadcast.

4. The receiver as recited in claim 1, wherein the receiver is further configured to receive a broadcast including the format definition.

5. The receiver as recited in claim 1, wherein the receiver is further configured to receive a multicast including the data.

6. The receiver as recited in claim 5, wherein the engine is further configured to receive the format definition from the multicast.

7. The receiver as recited in claim 1, wherein the definition includes a description of a syntax of the format.

8. The receiver as recited in claim 7, wherein the definition includes a description of semantics of the format.

9. The receiver as recited in claim 8, wherein the semantic description associates at least one identifier with the received data.

10. The receiver as recited in claim 8, wherein the syntax and semantics are described in a first language.

11. The receiver as recited in claim 8, wherein the syntax is described in a first language and the semantics are described in a second language.

12. The receiver as recited in claim 11, wherein the engine is further configured to produce an internal representation of the syntax and an internal representation of the semantics.

13. The receiver as recited in claim 12, wherein the engine is further configured to receive a query and use the internal representation to create at least one mask.

14. The receiver as recited in claim 13, wherein the semantic description associates at least one identifier with the received data, and the query uses the at least one identifier.

15. The receiver as recited in claim 13, wherein the engine further comprises at least one filter operable to apply the at least one mask to filter the received data.

16. The receiver as recited in claim 15, wherein the engine further comprises a filter characteristics object including information about the at least one filter, and wherein the engine is further configured to use the filter information to select at least one filter to apply the at least one mask.

17. The receiver as recited in claim 15, wherein the engine is further configured to forward at least a portion of the filtered data to an application.

18. The receiver as recited in claim 15, wherein the engine is further configured to produce an additional mask, based on the filtered data.

19. The receiver as recited in claim 15, wherein the engine is further configured to modify the at least one mask, based on the filtered data.

20. The receiver as recited in claim 13, wherein the engine is further configured to receive a second query.

21. The receiver as recited in claim 20, wherein the engine is further configured to create at least one additional mask, based on the second query.

22. The receiver as recited in claim 13, wherein the query is formulated using at least one of the first language and the second language.

23. The receiver as recited in claim 13, wherein the query is formulated using a third language.

24. The receiver as recited in claim 13, further comprising a mechanism operable to execute an application that formulates the query.

25. The receiver as recited in claim 24, wherein the query is discrete.

26. The receiver as recited in claim 24, wherein the query is continuous.

27. The receiver as recited in claim 1, wherein the engine is further configured to receive a query and use the internal representation to create the mask.

28. The receiver as recited in claim 27, wherein the semantic description associates at least one identifier with the received data, and the query uses the at least one identifier.

29. The receiver as recited in claim 27, wherein the engine further comprises at least one filter operable to apply the at least one mask to filter the received data.

30. The receiver as recited in claim 29, wherein the engine further comprises a filter characteristics object including information about the at least one filter, and wherein the engine is further configured to use the filter information to select at least one filter to apply the at least one mask.

31. The receiver as recited in claim 29, wherein the engine is further configured to forward at least a portion of the filtered data to an application.

32. The receiver as recited in claim 29, wherein the engine is further configured to produce an additional mask, based on the filtered data.

33. The receiver as recited in claim 29, wherein the engine is further configured to modify the at least one mask, based on the filtered data.

34. The receiver as recited in claim 27, wherein the engine is further configured to receive a second query.

35. The receiver as recited in claim 34, wherein the engine is further configured to create at least one additional mask, based on the second query.

36. The receiver as recited in claim 27, wherein the query is formulated using the first language.

37. The receiver as recited in claim 27, wherein the query is formulated using a second language.

38. The receiver as recited in claim 27, further comprising a mechanism operable to execute an application that formulates the query.

39. The receiver as recited in claim 38, wherein the query is discrete.

40. The receiver as recited in claim 38, wherein the query is continuous.

41. The receiver as recited in claim 1, wherein the data comprises television-related information.

42. The receiver as recited in claim 41, wherein the data comprises service information.

43. The receiver as recited in claim 1, wherein the engine is further operable to receive a query and use said definition to create at least one mask for use in filtering the received data.

44. The receiver as recited in claim 1, wherein the processing engine comprises a format specification interface which includes a syntax initialization engine and a semantics initialization engine.

45. The receiver as recited in claim 44, wherein said syntax initialization engine includes a lexical analyzer and parser.

46. A computer program product for processing formatted data, comprising a computer usable storage medium having machine readable code embodied therein for:
  receiving a format definition expressed in a Backus Naur Form, wherein said format definition comprises a description of a grammar which defines a syntax of a target language;
  configuring a data processing engine responsive to receiving the format definition;
  receiving additional data which conforms to the target language; produce an internal representation of the syntax and semantics; create at least one mask for use in processing additional data, the mask being based upon said internal representation; and
  processing the additionally received data in accordance with the format definition using the mask.

47. The computer program product as recited in claim 46, wherein the definition includes a syntax definition of the format.

48. The computer program product as recited in claim 47, wherein the definition includes a semantics definition of the format.

49. The computer program product as recited in claim 46, further configured to receive a query and use the internal representation to create the mask for filtering the received data.

50. The computer program product as recited in claim 49, further configured to provide the at least one mask to at least one filter.

51. The computer program product as recited in claim 50, further configured to set a mask according to at least a portion of filtered data returned by the at least one filter.

52. The computer program product as recited in claim 50, further configured to modify at least one mask according to at least a portion of filtered data returned by the at least one filter.

53. The computer program product as recited in claim 49, further configured to store filtered data returned by the at least one filter.

54. The computer program product as recited in claim 46, wherein the data includes television-related information.

55. The computer program product as recited in claim 46, further configured to receive a query and use said definition to create at least one mask for use in filtering the received data.

56. A receiver for processing data, comprising:
    a front end configured to receive a broadcast signal including a format definition expressed in a Backus Naur Form, wherein said format definition comprises a description of a grammar which defines a syntax of a target language; and
    a generic data processing engine configured to:
        receive said format definition;
        utilize the format definition to produce an internal representation of the syntax and semantics;
        receive a query; and
        create at least one mask for use in processing additional data, the mask being based upon said internal representation.

57. A computer program product for processing formatted data, comprising a computer usable storage medium having machine readable code embodied therein for:
    receiving a format definition expressed in a Backus Naur Form that comprises a description of a grammar which defines a syntax of a target language; and
    processing data formatted according to the definition, without use of formatting information in the data;
    wherein the definition includes a syntax definition of the format, and a semantics of the format, and wherein the code is operable to:
        produce an internal representation of the syntax and semantics;
        receive a query; and
        use the internal representation to create at least one mask for filtering the data.

58. A receiver for processing data, wherein said receiver comprises:
    a front end configured to receive a broadcast signal including a format definition, wherein said format definition comprises a description of a grammar which defines a syntax of a target language; and
    a generic data processing engine configured to:
        receive said format definition;
        utilize said format definition to generate a decoder operable to decode said target language;
        receive additional data which conforms to the target language; and
        process the additionally received data in accordance with the format definition using said decoder.

\* \* \* \* \*